US011675777B2

(12) United States Patent
Vallejo

(10) Patent No.: US 11,675,777 B2
(45) Date of Patent: Jun. 13, 2023

(54) METHOD, APPARATUS, AND COMPUTER READABLE MEDIUM FOR GENERATING AN AUDIT TRAIL OF AN ELECTRONIC DATA RECORD

(71) Applicant: Sparta Systems, Inc., Hamilton, NJ (US)

(72) Inventor: Shaun Vallejo, Red Band, NJ (US)

(73) Assignee: Sparta Systems, Inc., Hamilton, NJ (US)

( * ) Notice: Subject to any disclaimer, the term of this patent is extended or adjusted under 35 U.S.C. 154(b) by 0 days.

(21) Appl. No.: 17/006,473

(22) Filed: Aug. 28, 2020

(65) Prior Publication Data

US 2021/0064604 A1    Mar. 4, 2021

Related U.S. Application Data

(60) Provisional application No. 62/892,863, filed on Aug. 28, 2019.

(51) Int. Cl.
*G06F 16/23*     (2019.01)
*G06F 16/901*    (2019.01)
*G06F 16/22*     (2019.01)

(52) U.S. Cl.
CPC ...... *G06F 16/2379* (2019.01); *G06F 16/2255* (2019.01); *G06F 16/2358* (2019.01); *G06F 16/2365* (2019.01); *G06F 16/9024* (2019.01)

(58) Field of Classification Search
CPC ............. G06F 16/2379; G06F 16/2255; G06F 16/2358; G06F 16/2365; G06F 16/9024
USPC ...................................................... 707/703
See application file for complete search history.

(56) References Cited

U.S. PATENT DOCUMENTS

| | | | |
|---|---|---|---|
| 2003/0055807 A1* | 3/2003 | Lomet | G06F 16/2322 |
| 2005/0038774 A1* | 2/2005 | Lillibridge | G06Q 30/02 |
| 2005/0108295 A1* | 5/2005 | Karimisetty | G06F 16/8373 |
| 2008/0098482 A1* | 4/2008 | Hughes | A61P 31/04 |
| 2011/0078189 A1* | 3/2011 | Bonchi | G06Q 10/10 |
| | | | 707/776 |
| 2012/0089575 A1* | 4/2012 | Kerns | G06F 16/1734 |
| | | | 707/E17.007 |

(Continued)

FOREIGN PATENT DOCUMENTS

WO    WO 2016/032548 A1 *   3/2016   ............ G06F 15/16

*Primary Examiner* — James Trujillo
*Assistant Examiner* — Antonio J Caiado
(74) *Attorney, Agent, or Firm* — Bookoff McAndrews PLLC

(57) ABSTRACT

A method, apparatus, and computer-readable medium for generating an audit trail of a record including receiving a request to generate an audit trail of the record, the request comprising a record identifier of the record and a date value, identifying commit data structures corresponding to the record based on the record identifier, each commit data structure corresponding to a set of changes previously applied to fields of the record and comprising a timestamp value, a list of changes made to fields, and a prior commit pointer pointing to a prior commit data structure, identifying commit data structures that are pertinent to the request based at least in part on the timestamp value of at least one commit data structure and the date value, and generating the audit trail of the record based on the list of changes in each commit data structure in the identified commit data structures.

30 Claims, 16 Drawing Sheets

(56) References Cited

U.S. PATENT DOCUMENTS

| | | | |
|---|---|---|---|
| 2012/0173490 A1* | 7/2012 | Gould | G06F 11/1474 |
| | | | 707/648 |
| 2013/0080441 A1* | 3/2013 | Aboulnaga | G06F 16/8365 |
| | | | 707/741 |
| 2014/0006475 A1* | 1/2014 | Harpster | G06F 16/95 |
| | | | 709/202 |
| 2016/0147862 A1* | 5/2016 | Schreter | G06F 16/2308 |
| | | | 707/607 |
| 2017/0026270 A1* | 1/2017 | Handige Shankar | H04L 43/04 |
| 2017/0206234 A1* | 7/2017 | Zhang | G06F 16/2282 |
| 2018/0210966 A1* | 7/2018 | Bedi | G06F 16/2452 |
| 2018/0218023 A1* | 8/2018 | Fanghaenel | G06F 16/2343 |
| 2018/0367414 A1* | 12/2018 | Raghavendra | H04L 41/22 |
| 2019/0034465 A1* | 1/2019 | Shimamura | G06F 16/23 |
| 2019/0325055 A1* | 10/2019 | Lee | G06F 3/0644 |

\* cited by examiner

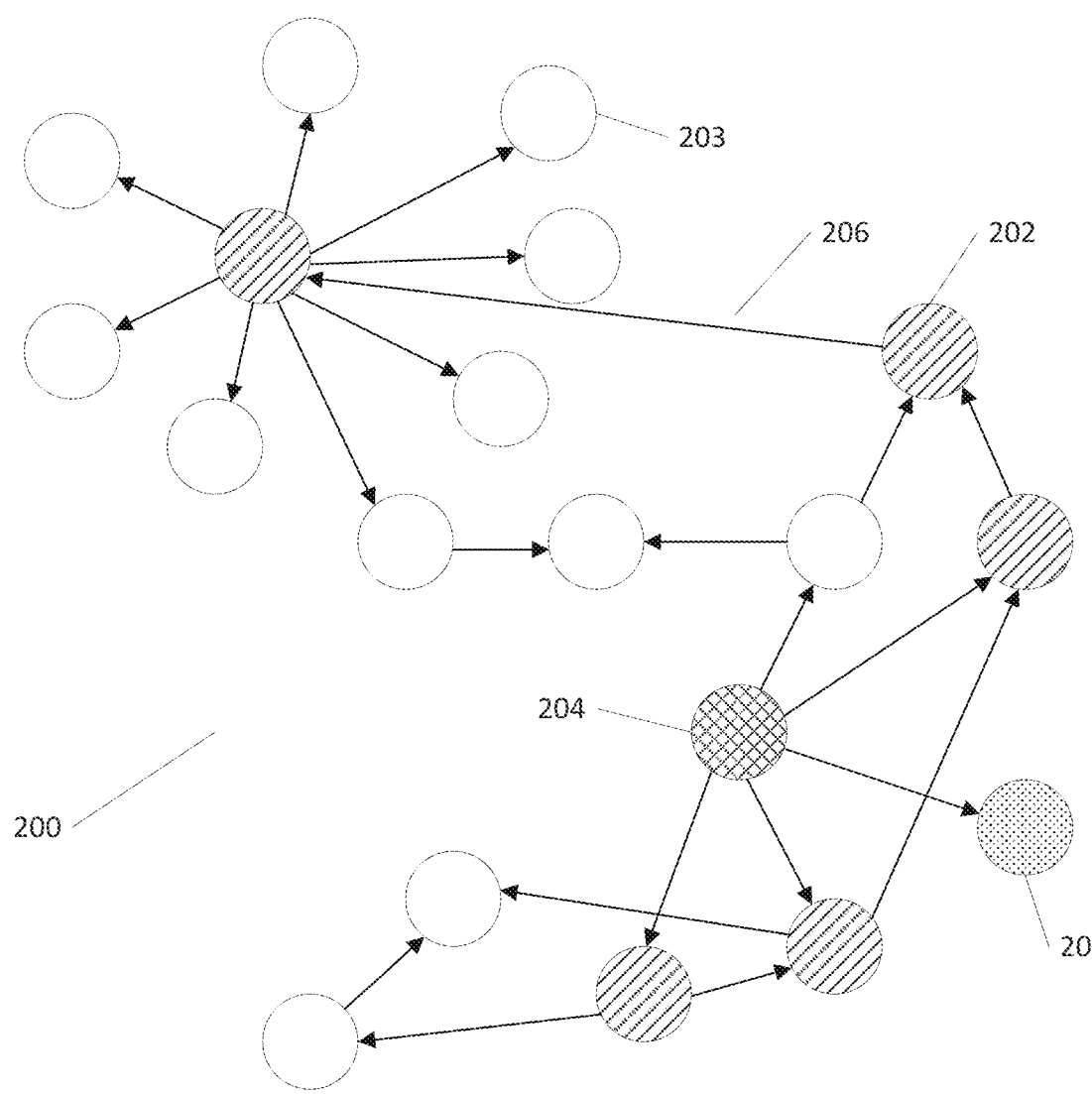
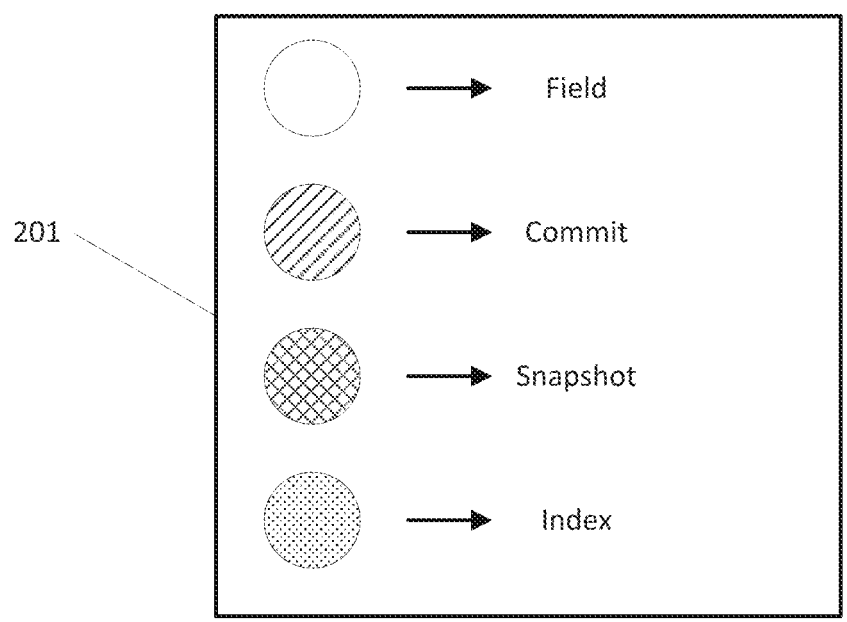
Fig. 2

Identifying a snapshot data structure corresponding to the electronic data record based at least in part on the record identifier, the snapshot data structure comprising a most-recent commit pointer pointing to the most-recent commit data structure

501

Identify the most-recent commit data structure by traversing the most-recent commit pointer

502

Identify the plurality of commit data structures corresponding to the electronic data record by traversing a plurality of prior commit pointers of the plurality of commit data structures starting with the most-recent commit data structure

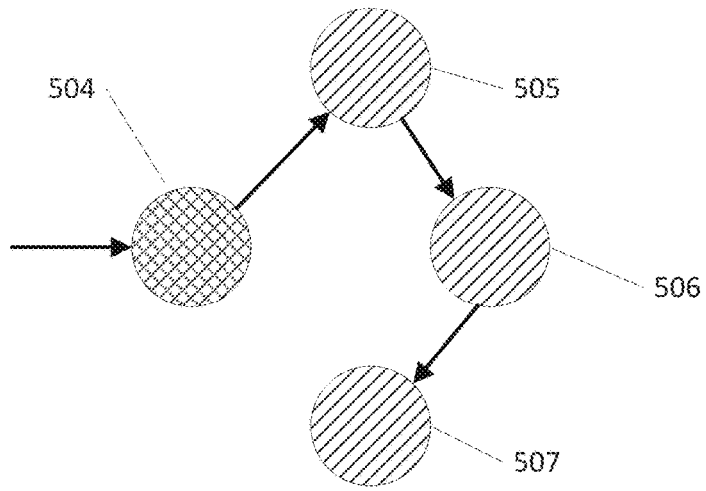

Fig. 5B

┌─────────────────────────────────────────────────────────────────┐
│ Identify a most-recent commit data structure in the identified one or more commit data │
│ structures │
│ 701 │
└─────────────────────────────────────────────────────────────────┘
                                    ↓
┌─────────────────────────────────────────────────────────────────┐
│ Iterate through each of the one or more commit data structures beginning at the most- │
│ recent commit data structure by traversing the prior commit pointer of each commit data │
│ structure │
│ 702 │
└─────────────────────────────────────────────────────────────────┘

Fig. 7A

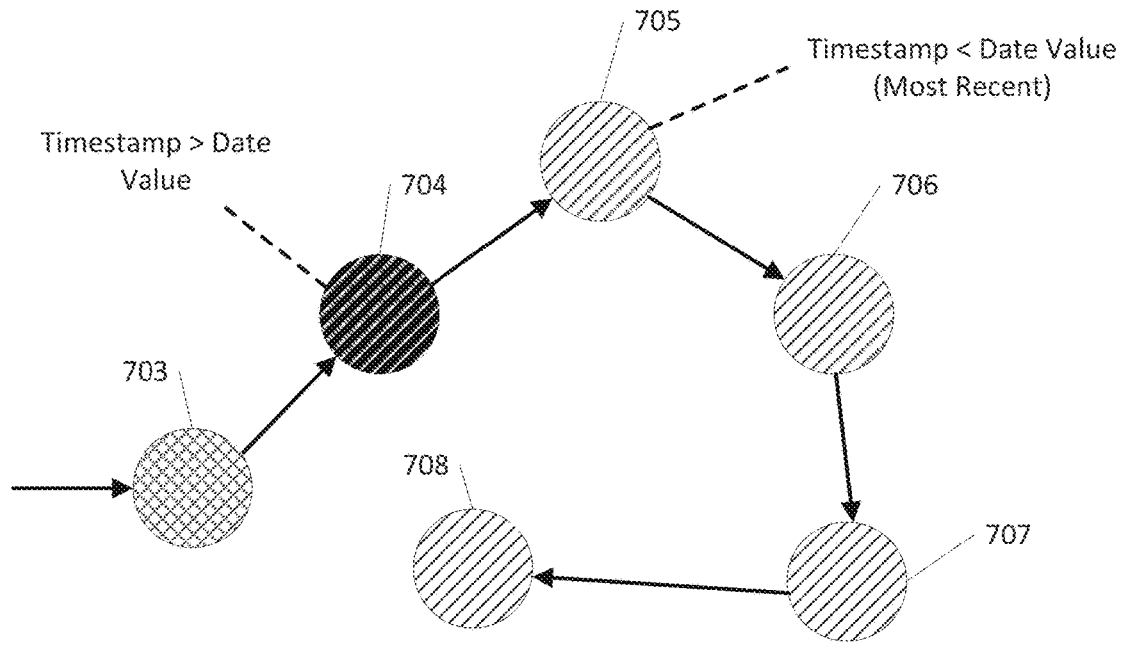

Fig. 7B

METHOD, APPARATUS, AND COMPUTER READABLE MEDIUM FOR GENERATING AN AUDIT TRAIL OF AN ELECTRONIC DATA RECORD

RELATED APPLICATION DATA

This application claims priority to U.S. Provisional Application No. 62/892,863 filed Aug. 28, 2019, the disclosure of which is hereby incorporated by reference in its entirety.

BACKGROUND

The Food and Drug Administration's (FDA) Part 11 (21 CFR Part 11) and the European Union's (EU) Annex 11 (EudraLex) Rules Governing Medicinal Products in the European Union (Volume 4, Good Manufacturing Practice (GMP), Medicinal Products for Human and Veterinary Use), require compliance for ensuring integrity of electronic records and auditing of all changes made to the electronic records. There are several explicit requirements commonly shared across these regulatory bodies. These requirements may include, for example, automating audit trail entries; ensuring audit trail entries are secure and not editable; ensuring audit trail entries contain accurate timestamp of change; ensuring audit trail entries contain the change detail, including who performed the change, the prior and subsequent values, and an explanation as to the reason for the change; and availability of an audit trail for the entire retention period of the record.

Conventional audit trailing technologies utilize various forms of application and database controls to fulfill these requirement by entering audit trail entries in a corresponding database. For example, a typical audit trail in a database may appear in a separate row, where auditing is controlled by a database trigger or application construct. The audit trails being configured to store the delta of each particular change and the particulars of that change.

However, there are several problems and drawbacks with the conventional technology. These disadvantages include— (i) difficulty in enforcement as traditional database solutions allow for a single person to access the database to alter the record; (ii) greater use of memory space given the amount of data that is stored in the audit trail and the number of changes, as data is essentially duplicated across multiple rows; (iii) potential manipulation of the audit trail through defect or through a single bad actor, or alternatively corrupted through database manipulation as the audit trail is physically decoupled from the system of record; (iv) it is impossible to get an "as of" version of the record, making it difficult for auditors to view the record; and (v) use of additional auditing technology of the audit records in order to prove that a database administrator has not altered the record. The requirement of immutability is traditionally difficult to enforce as conventional database solutions allow for a single person with access to the database to alter records.

Accordingly, there is a need for improvements in audit trail generation technology to overcome these drawbacks present in conventional technology while reducing memory usage and ensuring that the integrity of electronic records is maintained.

BRIEF DESCRIPTION OF THE DRAWINGS

FIG. 2 illustrates a representation of an example of a graph database corresponding to an electronic data record that utilizes the specialized data structures of FIG. 1 according to an exemplary embodiment.

FIG. 5A illustrates another flowchart for identifying a plurality of commit data structures corresponding to the electronic data record based at least in part on the record identifier according to an exemplary embodiment.

FIG. 5B illustrates an example of identifying a plurality of commit data structures corresponding to the electronic data record using the method shown in FIG. 5A according to an exemplary embodiment.

FIG. 7A illustrates a flowchart for generating the audit trail of the electronic record based at least in part on the list of one or more changes in each commit data structure in the identified one or more commit data structures that have been selected for inclusion in the audit trail according to an exemplary embodiment.

FIG. 7B illustrates an example of the iterative traversal process shown in the flowchart of FIG. 7A according to an exemplary embodiment.

DETAILED DESCRIPTION

Figure 1:
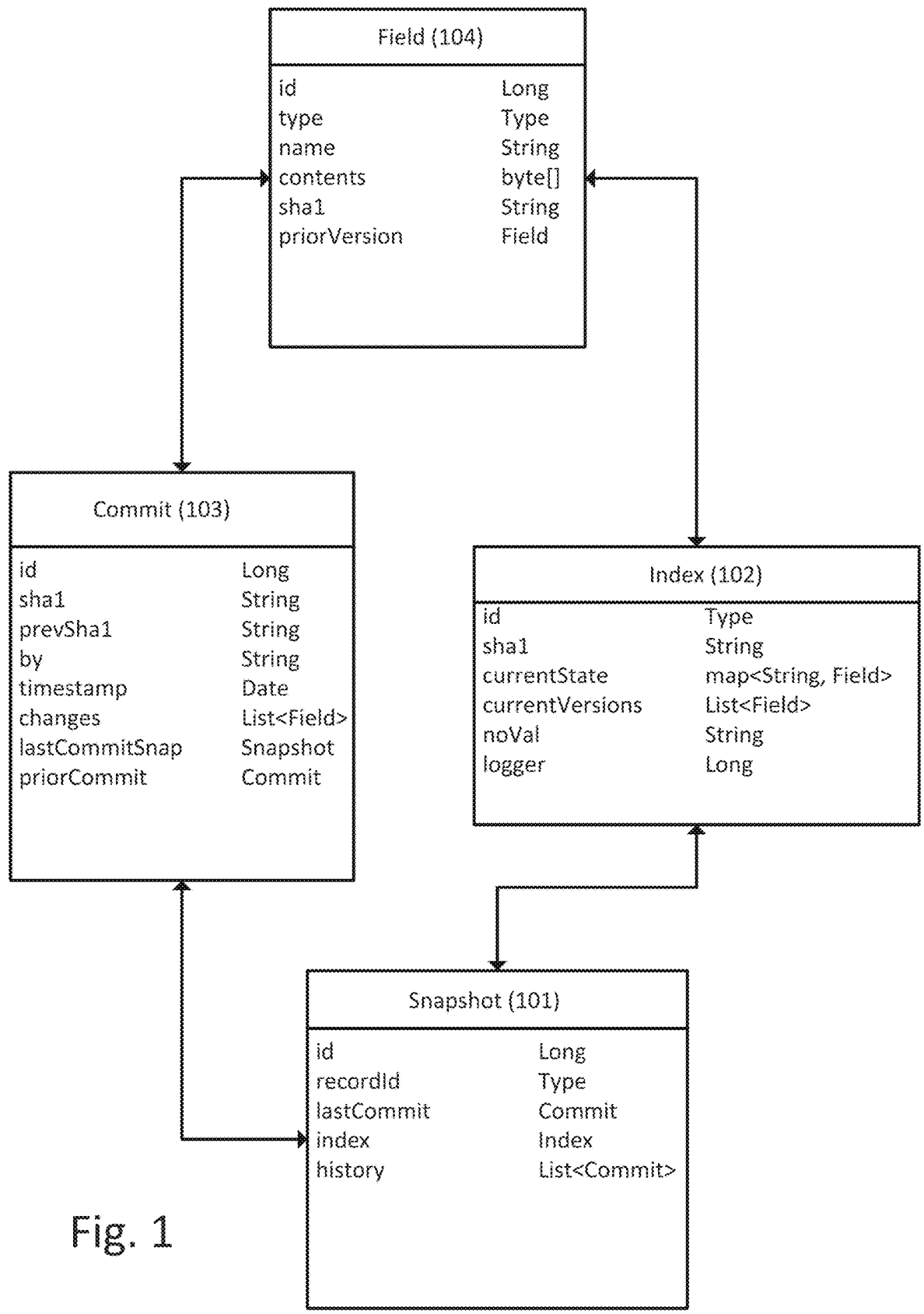
FIG. 1 illustrates a data structure diagram of specialized data structures utilized in the present system and method for generation of an audit trail of an electronic data record, according to an exemplary embodiment.

While methods, apparatuses, and computer-readable media are described herein by way of examples and embodiments, those skilled in the art recognize that methods, apparatuses, and computer-readable media for generating an audit trail of an electronic data record are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

Applicant has discovered a novel method, apparatus, and computer-readable medium for generating an audit trail of an electronic data records that utilizes novel data structures and techniques.

The present system utilizes a snapshot based version control system for electronic records that allows for the audit trail and the system of record to be one logical entity. As will be discussed in further detail below, this is accomplished by implementing version control of records by having each version of each record serve as a self-contained repository. Thereby, the inventive concepts provide solutions over problems faced by the conventional technology in maintaining electronic records that include saving actual physical drive space, maintaining data integrity verification and/or validation, and targeted search and retrieval of the electronic records and the audit trail associated with electronic records.

As the disclosed system unifies the system of record and the audit trail, there are several significant advantages to inventive concepts disclosed herein. Some of these advantages include, for example, (i) high resistance to tampering of any kind; (ii) high efficiency in use of memory space that may include physical drive space; and (iii) more user-friendly consumption of data or electronic records. With respect to high resistance to tampering of any kind, the inventive concepts disclosed herein make it nearly impossible for a single bad actor to tamper, alter, or change the electronic records.

With respect to achieving high efficiency in the use of memory space, the system can utilize a graph database to store records and relationships to thereby minimize data storage since electronic records are not duplicated for the audit trail, as the system of record and the components of the audit are the same physical entity.

Additionally, the present system includes functionality for "as of" view that allows a user to retrieve an audit trail as of a particular date, as well as capabilities to do real-time comparison of records through multiple versions and cloning of records for reporting purposes or correction of errors.

The system disclosed herein achieves verification through the collection of linked hashes, which can be implemented with any Secure Hash Algorithms (SHA), such as SHA-1, SHA-2 and SHA-256 hashes that allow for the system to be self-verifying from any single actor.

The present system prevents a single actor, such as a database administrator, from tampering with or modifying the data without detection. This is accomplished through a sequential hashing scheme that relies upon the contents of the electronic data records as well the application code that is associated with the commit and used to execute, access, modify, or commit changes to the electronic data records.

The present system also protects auditing from modification through computative algorithms such as, including but not limited to, SHA-1 that are generally not possible via human or manual efforts for high volume electronic records. By taking both the change and all prior changes and creating a unique, irreversible signature, the present system makes undetected modification of the system extremely difficult and nearly impossible by a single person.

Moreover, by complying with CFR part 11 of having all data and record be in electronic format, the systems disclosed herein are able to maintain millions of records electronically with minimal use of memory space. The systems disclosed herein, which store information in a non-readable human format, can generate a full listing of changes to a document in real-time and on demand or alternatively generate a listing of changes based on a supplied date at a later point in time.

A detailed descriptions of the disclosed method, apparatus, and computer-readable medium is now provided. The systems disclosed herein advantageously ensure the integrity of electronic records by modifying electronic records through algorithms such as Secure Hash Algorithms, by taking the change and prior changes to the records and creating a unique, irreversible signature. Thereby, making undetected modification of the system extremely difficult and nearly impossible by a single person, actor, or entity to perform or carry out.

FIG. 1 illustrates a data structure diagram of specialized data structures utilized in the present system and method for generation of an audit trail of an electronic data record, according to an exemplary embodiment. The data structure diagram corresponds to the data structures used to store the required information to generate an audit trail of an electronic data record (also referred to herein as a "record").

As shown in FIG. 1., the specialized data structures include a snapshot data structure 101 (also referred to herein as "snapshot"), an index data structure 102 (also referred to herein as "index"), a commit data structure 103 (also referred to herein as "commit"), and a field data structure 104 (also referred to herein as "field").

As used herein, an electronic data record includes any type of electronic record having one or more fields and associated values for the one or more fields. In the present system, each version of each field of an electronic data record is stored as a self-contained repository in a field data structure 104 ("field"). The field 104 includes an identifier for that particular field data structure ("id"), a field type ("type"), a name ("name"), and a stored value ("contents") which is shown stored as a byte array but can be stored in any suitable format. For purposes of saving memory space, the value can be stored as a zipped byte array such that less physical drive space is used.

The field data structure 104 also includes a hash value of the stored value in the "contents" byte array. This is used for verification purposes and to detect tampering of the field 104. The field 104 additionally includes a reference to a prior version of that field data structure 104 (which is itself a different field 104 object) in the form of a prior-version field pointer "priorVersion" that points to the earlier field data structure.

The snapshot data structure 101 provides a view of an electronic data record at any given point in time. Each snapshot data structure 101 has an identifier ("id") and corresponds to an electronic data record that is identified by the record identifier ("recordId"). Each snapshot 101 also includes a reference to the last change made to the electronic data record in the form of a "lastCommit" pointer to a commit data structure (discussed below).

The snapshot 101 further include a history of all changes to the corresponding electronic data record in the form of a plurality of commit pointers pointing to a plurality of commit data structures (indicated as a variable "history" which is itself a list of pointers to commit data structures). The snapshot also includes a pointer to an index data structure 102 for the electronic data record, which is discussed below.

The index data structure 102 ("index") corresponds to the current status and values of an electronic data record. Index 102 includes an identifier ("id") and a hash value ("sha1") which is generated by hashing the commit data structures associated with the electronic data record. The index 102 can also include a "currentState" map. The currentState map contains record identifiers (the "recordId" in the snapshot, which is of type "String") as keys and the corresponding field data structures ("Field") as values. The currentState map can be utilized as part of a difference resolution algorithm rather than the schema itself. When a commit is introduced, the index is responsible for identifying which objects have changed. In order to do this efficiently, the currentState map can be utilized.

The index 102 is used to track the current versions of all fields in an electronic record, as indicted by the "currentVersions" variable, which is a list of field pointers to the current version of each field (i.e., the field data structures) in the electronic data record. The index additionally can include the "noVal" string which is a placeholder to track whether a field is new or not. This can be an arbitrary string value that is not a legitimate SHA1 hash. Additionally, when implemented in a Java environment, the Index (102) can include a java logger ("logger") which is used to log messages during execution.

The commit data structure 103 includes an identifier ("id") and corresponds to an electronic data record and, more specifically, corresponds to a set of changes previously applied to one or more fields of the electronic data record.

Commit 103 includes a hash value of the current state as of the commit ("sha1") and a second hash value of the current state as of the previous commit ("prevSha1"). The hash value is generated based at least in part on the one or more fields of the electronic data record changed by a commit corresponding to the commit data structure (i.e., the field data structures corresponding to the commit). Additionally the previous hash value corresponds to a prior hash value of a prior commit data structure that is pointed to by a prior commit pointer ("priorCommit"). Both hash values can further be generated based at least in part on a salt value derived from application code of an application associated with the commit, for example, an application that performed, called, or executed the commit. This ensures that an actor with access to either the application code or to the database of electronic records cannot make changes to any part of the records without integrity being compromised. The linked hashing (the storage of the hash and the previous hash in the commit) means that any change to an electronic record results in each hash being recalculated for every commit moving forward in order for the record to pass validation checks. As the integrity of a commit has a downstream effect on each individual commit, any change or alteration can therefore be traced down to the individual data point that is altered.

The commit data structure 103 can further include the name of the entity, program, procedure, or person that executed the commit (the "by" string). Commit 103 also includes a timestamp of the date of the commit. This date can take any format, such as UNIX time or a month, day, and year format.

The changes to the electronic data record that are saved by a particular commit 103 are represented as a list of field pointers to field objects ("changes," which is a list of field pointers). Since a new field object is created for each change to a field, the storage of these changes in the commit data structure 103 is accomplished by linking to each of the generated field objects for a particular commit.

As mentioned above, the commit data structure 103 additionally includes a prior commit pointer ("prior Commit") that points to the previous commit data structure for the electronic data record. As will be described further below, this pointer is utilized to traverse the commits when generating an audit trail (also referred to herein as a "log"). Additionally, the commit 103 can include a snapshot pointer ("lastCommitSnap") that will contain a pointer to the snapshot if the commit is the most recent commit for a particular electronic data record. This value assist with processing of graph queries by providing the ability rewind a record by commits from the snapshot of that record. Maintaining a relationship to the most current commit allows this process to be performed efficiently.

In an exemplary embodiment, the specialized data structures described in FIG. 1 and the pointers between them can be stored in a graph database, with each data structure corresponding to a node in the graph database and each pointer corresponding to a directional edge(relationship) between the nodes. In this case, each commit data structure, each snapshot data structure, each index data structure, and each field data structure is stored as a node in the graph database and each index pointer, commit pointer, field pointer, and snapshot pointer is stored as a directional edge between the nodes in the graph database. A graph database is configured for high-speed traversal of relationships between different nodes, which can improve system performance.

FIG. 2 illustrates a representation of an example of a graph database corresponding to an electronic data record that utilizes the specialized data structures of FIG. 1 according to an exemplary embodiment. As shown in the key 201 of FIG. 2, the graph database 200 includes different types of nodes corresponding to the field data structure, the commit data structure, the snapshot data structure, and the index data structure. For example, node 203 is a field node, node 202 is a commit node, node 204 is a snapshot node, and node 205 is an index node.

The graph database 200 also stores pointers between the data structures as edges or relationships between the nodes. Specifically, each pointer is represented as a directional edge from the parent entity to the child entity. For example, the edge 206 between two commit nodes corresponds to a pointer from commit node 202 to the other commit node. This can correspond to the priorCommit pointer discussed with respect to FIG. 1.

As shown in FIG. 2, the commit nodes can have an outgoing edge to field nodes, indicating that particular fields are modified by a particular commit. Each version of each field of the electronic data record is represented as a different field node. Additionally, each commit node can link to an earlier commit node. The relationship between each node and its corresponding preceding node is therefore indicative of modifications and the changes that have been made to the fields of the electronic data record. As will be discussed further below, these features enable the dynamic generation of an audit trail from the records themselves by traversing the appropriate nodes in an order corresponding to the audit request. This eliminates the need to separately store audit information and enables custom audit ranges of any fields of any electronic data records in the system. Furthermore, the requirement of immutability is enforced through the hashing processes and the use of a hash salts, as discussed earlier. By utilizing the current state of the system to compute a commit hash and also utilizing prior hashes corresponding to earlier states, the present system makes undetected modification of the electronic data record or audit trail extremely difficult and nearly impossible by a single person or entity.

While a graph database is described herein as an exemplary storage system, alternative storage systems and databases can also be utilized to implement the present invention instead of a graph database. The system can be implemented using the data structures (such as pointers and linked lists) described with respect to FIG. 1. For clarity, several examples in this application utilize a graph database to illustrate and represent specialized processes and functions performed by the present system. It is understood that these processes and functions can be implemented on other types of storage without compromising the many advantages of the present system.

Figure 3:
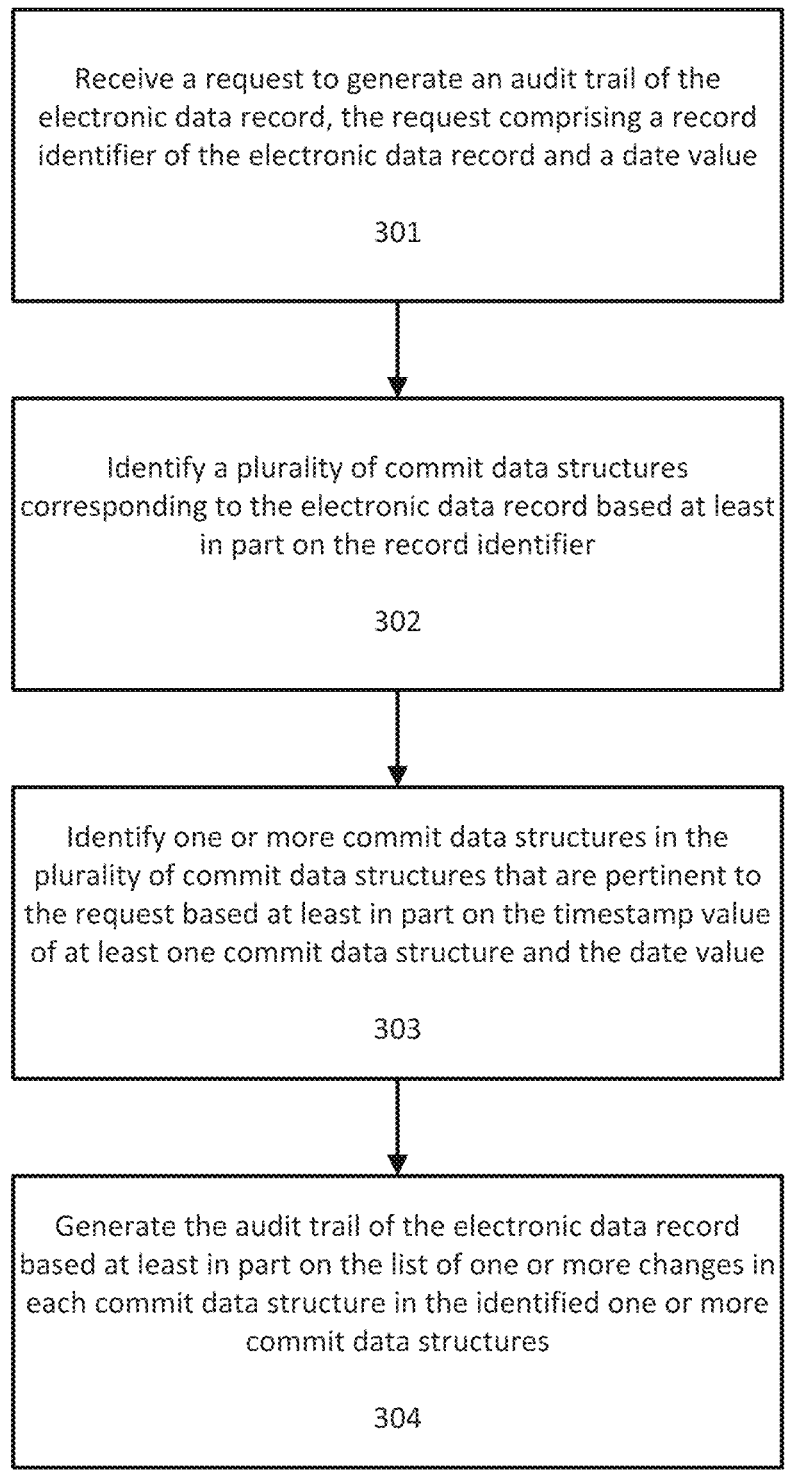
FIG. 3 illustrates a flowchart for generating an audit trail of an electronic data record according to an exemplary embodiment.

FIG. 3 illustrates a flowchart for generating an audit trail of an electronic data record according to an exemplary embodiment. At step 301 a request to generate an audit trail of the electronic data record is received, the request comprising a record identifier of the electronic data record and a date value. The date value can indicate an "as of" date (i.e., an end date) for the audit, such that only changes prior to that date are retrieved and presented in the audit trail. The date value can also indicate a start date such that only changes after the start date are retrieved and presented in the audit trail. The date value can also comprise a date range comprising a start date and an end date, such that only changes after the start date and before the end date are retrieved and presented in the audit trail. Many variations are possible, and the following examples are not intended to be limiting.

At step 302 a plurality of commit data structures corresponding to the electronic data record are identified based at least in part on the record identifier. As discussed earlier, each commit data structure corresponds to a set of changes previously applied to one or more fields of the electronic data record and includes a timestamp value, a list of one or more changes made to one or more fields of the electronic data record, and a prior commit pointer pointing to a prior commit data structure corresponding to a previous set of changes applied to one or more fields of the electronic data record. The list of one or more changes in each commit data structure can be represented as a list of one or more field pointers to one or more field structures, as discussed with reference to FIG. 1. Additionally, as will be explained with reference to FIGS. 4A-4B and 5A-5B, the step of identifying a plurality of commit data structures corresponding to the electronic data record can be performed in multiple ways.

Figure 4A:
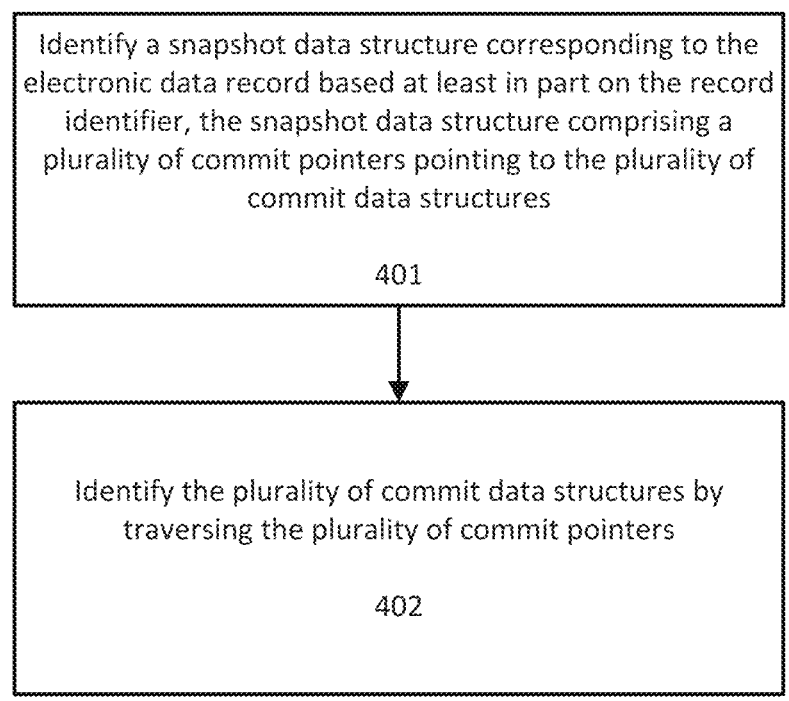
FIG. 4A illustrates a flowchart for identifying a plurality of commit data structures corresponding to the electronic data record based at least in part on the record identifier according to an exemplary embodiment.

FIG. 4A illustrates a flowchart for identifying a plurality of commit data structures corresponding to the electronic data record based at least in part on the record identifier according to an exemplary embodiment. The process shown in FIG. 4A utilizes the commit history stored in each snapshot to identify the commit data structures corresponding to a particular electronic data record.

At step 401 a snapshot data structure corresponding to the electronic data record is identified based at least in part on the record identifier, the snapshot data structure including a plurality of commit pointers pointing to the plurality of commit data structures. As discussed above, the plurality of commit data structures correspond to the history of commits for the record. This step can be performed with a lookup operation using the record identifier to locate the snapshot, as each electronic data record has only a single corresponding snapshot. At step 402 the plurality of commit data structures are identified by traversing the plurality of commit pointers.

Figure 4B:
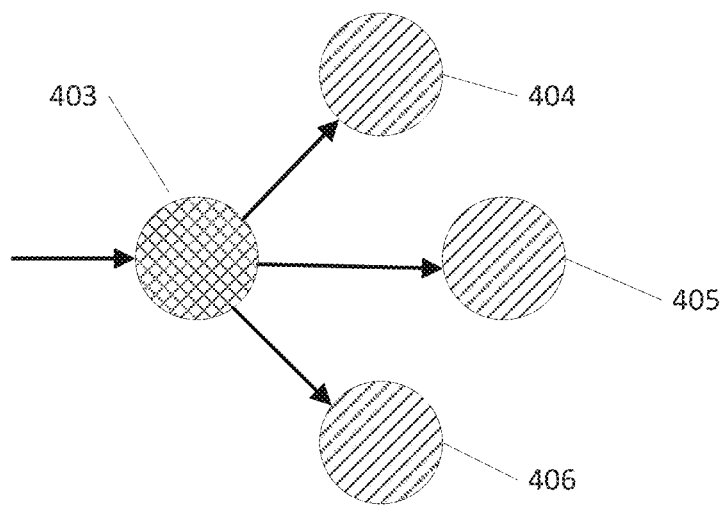
FIG. 4B illustrates an example of identifying a plurality of commit data structures corresponding to the electronic data record using the method shown in FIG. 4A according to an exemplary embodiment.

FIG. 4B illustrates an example of identifying a plurality of commit data structures corresponding to the electronic data record using the method shown in FIG. 4A according to an exemplary embodiment. FIG. 4B illustrates the process on a graph database, but it is understood that other implementations are possible. As shown in FIG. 4B, the snapshot node 403 shares directional edges to commit nodes 404, 405, and 406, which are all of the previous commits performed. The process of identifying the plurality of commit data structures is therefore performed by traversing the outgoing edges from snapshot node 403 to reach each of commit nodes 404-406.

FIG. 5A illustrates another flowchart for identifying a plurality of commit data structures corresponding to the electronic data record based at least in part on the record identifier according to an exemplary embodiment. As shown in FIG. 5A, the step of identifying a plurality of commit data structures corresponding to the electronic data record can also be performed by traversing a pointer from the snapshot to the most recent commit and then traversing pointers from each commit to a previous commit.

At step 501 a snapshot data structure corresponding to the electronic data record is identified based at least in part on the record identifier, the snapshot data structure comprising a most-recent commit pointer pointing to a most-recent commit data structure. A most-recent commit data structure is the commit corresponding to the latest set of changes to the electronic record. At step 502 the most-recent commit data structure is identified by traversing the most-recent commit pointer. At step 503 the plurality of commit data structures corresponding to the electronic data record are identified by traversing a plurality of prior commit pointers of the plurality of commit data structures starting with the most-recent commit data structure. This is an iterative process in which each prior commit pointer of each commit is used to reach the next previous commit.

FIG. 5B illustrates an example of identifying a plurality of commit data structures corresponding to the electronic data record using the method shown in FIG. 5A according to an exemplary embodiment. FIG. 5B illustrates the process on a graph database, but it is understood that other implementations are possible. As shown in FIG. 5B, the snapshot node 504 has a directional edge (corresponding to the most-recent commit pointer) to the most recent commit node 505. The most recent commit node 505 has a directional edge (corresponding to the prior commit pointer) to a prior commit node 506. The prior commit node 506 has a directional edge (corresponding to the prior commit pointer) to an even earlier commit node 507. The process of identifying the plurality of commit data structures is therefore performed by traversing the outgoing edge from snapshot node 504 to commit node 505, the edge from commit node 505 to commit node 506, and the edge from commit node 506 to commit node 507. This process can continue until a null value is reached for the prior commit pointer (i.e., there are no more prior commits).

Returning to FIG. 3, at step 303 one or more commit data structures in the plurality of commit data structures that are pertinent to the request are identified based at least in part on the timestamp value of at least one commit data structure and the date value. This step selects the commit data structures that are to be used to generate the audit trail and filters out the commits (changes) to the electronic data record before or after the date value or outside of a date range. It will not always be necessary to examine the timestamp of all commit data structures. For example, if a commit data structure is determined to be prior to start date, then all prior commit data structures can be eliminated without examining their timestamps. Similarly, if a commit data structure is determined to be after an end date, then all subsequent commit data structures can be eliminated without examining their timestamps.

Figure 6A:
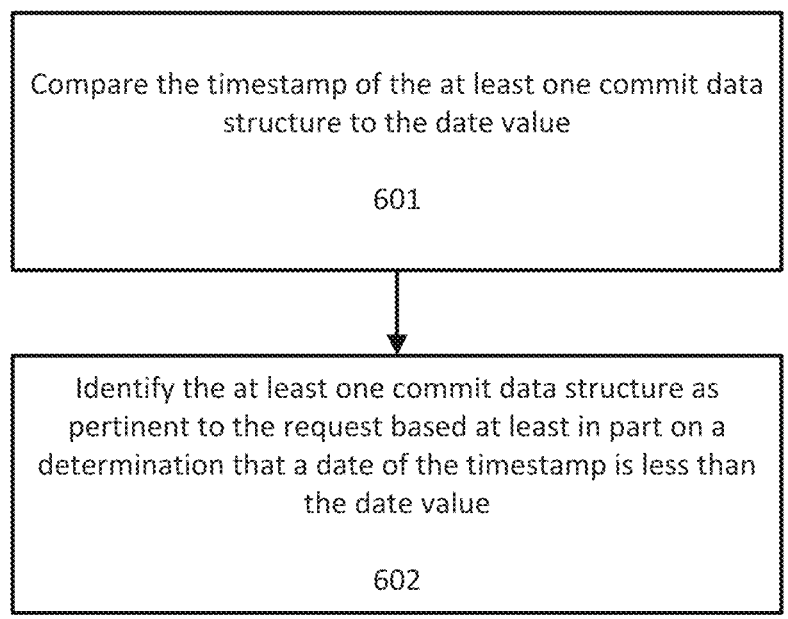
FIG. 6A illustrates a flowchart for identifying one or more commit data structures in the plurality of commit data structures that are pertinent to the request based at least in part on the timestamp value of each commit data structure and the date value according to an exemplary embodiment.
Figure 6B:
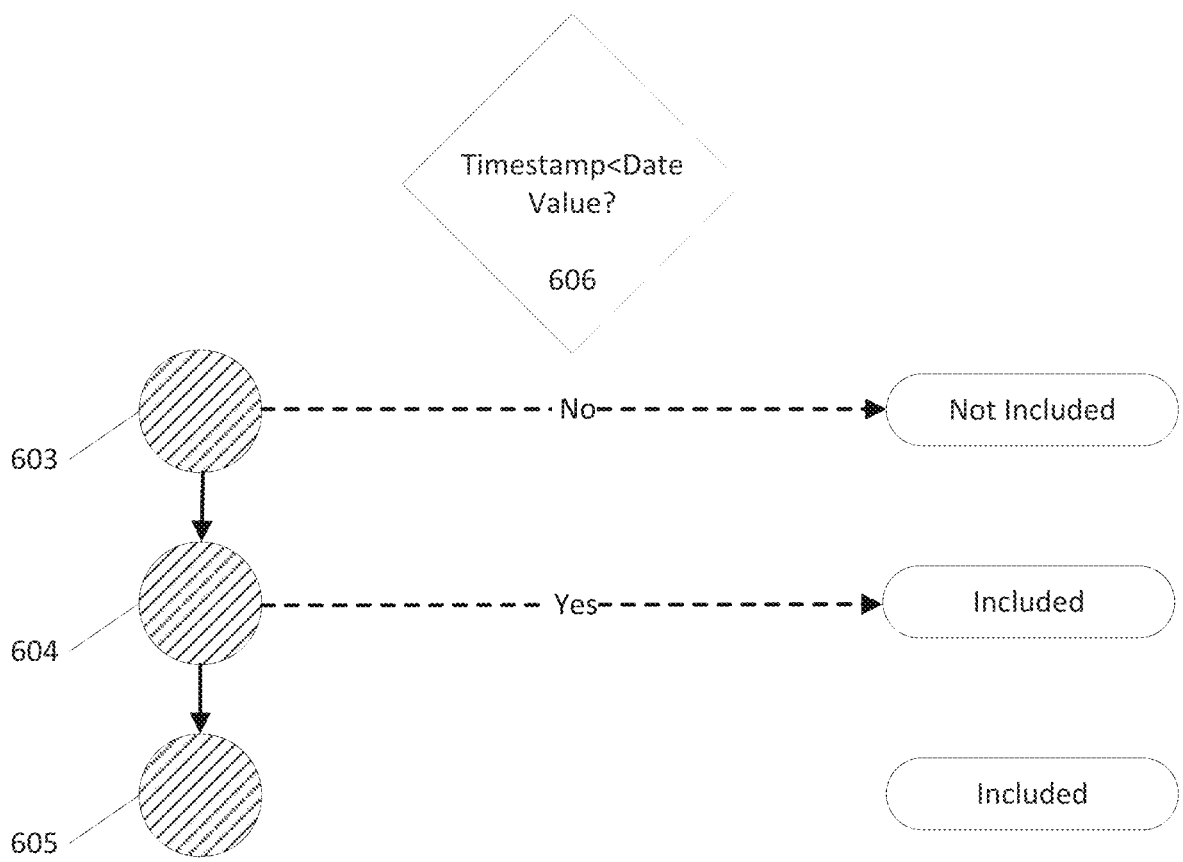
FIG. 6B illustrates an example of this process for three commit data structures according to an exemplary embodiment.

FIG. 6A illustrates a flowchart for identifying one or more commit data structures in the plurality of commit data structures that are pertinent to the request based at least in part on the timestamp value of each commit data structure and the date value according to an exemplary embodiment. The process shown in FIG. 6A can be performed for at least one commit data structure in the plurality of commit data structures identified in step 302 of FIG. 3 and is directed to identifying all commits prior to an end date. At step 601 the timestamp of the at least one commit data structure is compared to the date value. At step 602 the at least one commit data structure is identified as pertinent to the request based at least in part on a determination that a date of the timestamp is less than the date value FIG. 6B illustrates an example of this process for three commit data structures according to an exemplary embodiment. As shown in FIG. 6B, commit node 603 has a timestamp that is not prior to the date value, so it is not included in the set of commits from which the audit trail will be generated. Conversely, commit node 604 has a timestamp that is prior to the date value so it is included. The timestamp of commit node 605 does not need to be examined and it is included since commit node 605 is prior to commit node 604 (i.e., the prior commit pointer of node 604 points to node 605) and commit node 604 is already included.

Returning to FIG. 3, at step 304 the audit trail of the electronic data record is generated based at least in part on the list of one or more changes in each commit data structure in the identified one or more commit data structures. As discussed earlier, the list of one or more changes made to one or more fields of the electronic data record can be a list of one or more field pointers to one or more field data structures, each field data structure corresponding to a field of the electronic data record. Additionally, as explained with reference to FIG. 1 each field data structure can include a content value indicating contents of the field as a result of a commit corresponding to the commit data structure (e.g., the byte array) and a prior-version field pointer to a prior-version field data structure corresponding to the field of the electronic data record prior to the commit.

FIG. 7A illustrates a flowchart for generating the audit trail of the electronic record based at least in part on the list of one or more changes in each commit data structure in the identified one or more commit data structures that have been selected for inclusion in the audit trail according to an exemplary embodiment. The process shown in FIG. 7A is part of the overall audit trail generation step and relates to the traversal of the commit data structures/nodes.

At step 701 a most-recent commit data structure in the identified one or more commit data structures is identified. The most-recent commit data structure can be identified based on a timestamp, based on a position within the graph database (or in an array, list, index, or linked list). The most-recent commit data structure can also be designated as the first commit data structure traversed, since traversals proceed backwards chronologically.

At step 702 each of the one or more commit data structures beginning at the most-recent commit data structure are iterated through by traversing the prior commit pointer of each commit data structure. This step walks through each commit data structure and processes each commit data structure (as described with respect to FIG. 8) to generate the audit trail.

FIG. 7B illustrates an example of the iterative traversal process shown in the flowchart of FIG. 7A according to an exemplary embodiment. As shown in FIG. 7B, the traversal begins at snapshot node 703 and proceeds to commit node 704, which has a timestamp greater than the date value. Commit node 704 is therefore excluded from the one or more commit nodes identified for inclusion in the audit trail. The traversal then proceeds to commit node 705, which has a timestamp less than the date value and is therefore designated at the most-recent commit node (that fulfills the date value condition/criteria). The traversal then proceeds on to commit node 706 and commit node 707.

Figure 8:
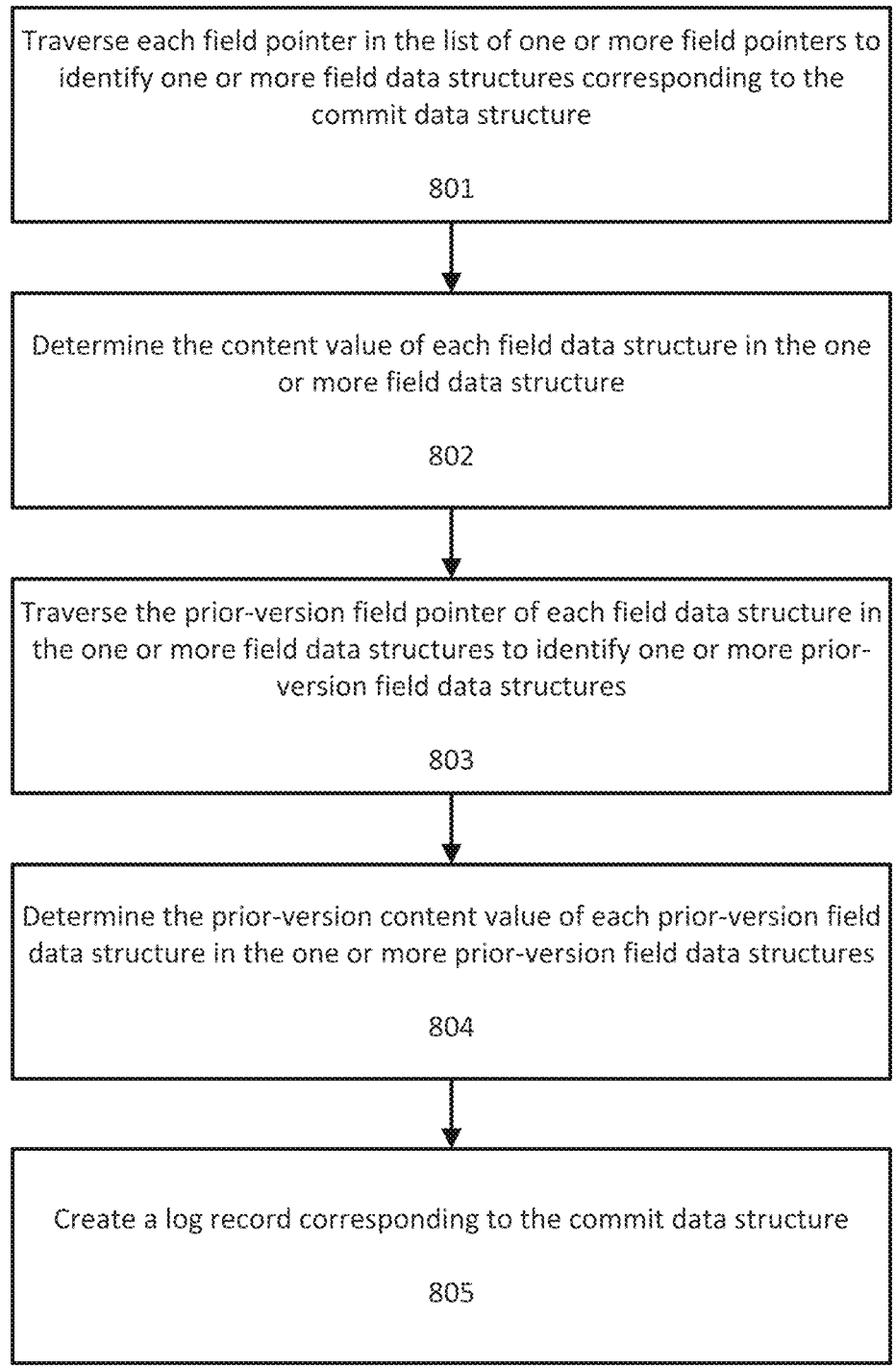
FIG. 8 illustrates a flowchart for generating the audit trail of the electronic data record based at least in part on the list of one or more changes in each commit data structure in the identified one or more commit data structures that have been selected for inclusion in the audit trail according to an exemplary embodiment.

The process for generating the audit trail from each selected/identified commit node will now be described with respect to FIG. 8. FIG. 8 illustrates a flowchart for generating the audit trail of the electronic data record based at least in part on the list of one or more changes in each commit data structure in the identified one or more commit data structures that have been selected for inclusion in the audit trail according to an exemplary embodiment. The process shown in FIG. 8 is also part of the overall audit trail generation step and relates to the processing of the traversed commit data structure to generate the audit trail (log).

The steps shown in FIG. 8 are performed for each commit data structure that is traversed (and that is included in the commit nodes identified for inclusion in the audit trail/pertinent to the request). At step 801 each field pointer in the list of one or more field pointers is traversed to identify one or more field data structures corresponding to the commit data structure. At step 802 the content value of each field data structure in the one or more field data structures is determined. At step 803 the prior-version field pointer of each field data structure in the one or more field data structures is traversed to identify one or more prior-version field data structures. At step 804 the prior-version content value of each prior-version field data structure in the one or more prior-version field data structures is determined. At step 805 a log record is created corresponding to the commit data structure, the log record comprising the timestamp value of the commit data structure, the prior-version content value of each prior-version field data structure in the one or more prior-version field data structures, and the content value of each field data structure in the one or more field data structures.

Figure 9:
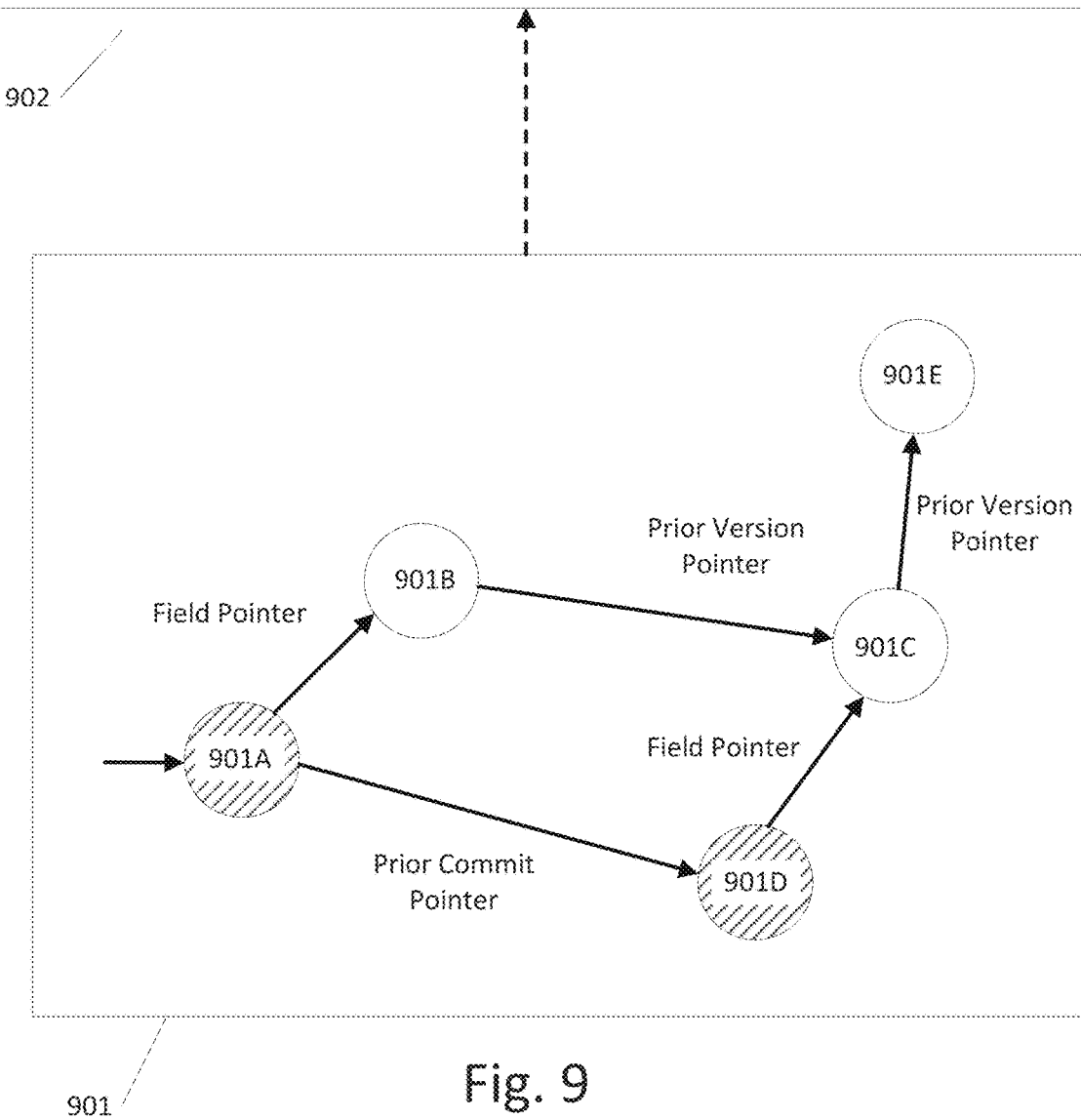
FIG. 9 illustrates an example of the audit trail generation process of FIG. 8 according to an exemplary embodiment.

FIG. 9 illustrates an example of the audit trail generation process of FIG. 8 according to an exemplary embodiment. As shown in the graph database 901, commit node 901A is first traversed. The timestamp for commit node 901A is added to the audit trail 902 in the first row ("Aug. 26, 2020"). Commit node 901A has one field pointer to field node 901B, so this edge is traversed to reach field node 901B. Field node 901B provides the field name ("Widgets") and the current value of the field ("37") at the time of the commit corresponding to commit node 901A. The prior version pointer from field node 901B is then traversed to reach field node 901C. Field node 901C then provides the prior value of the field ("34") in the first row of audit trail 902.

Having completed the first commit node 901A, the prior commit pointer is traversed to reach commit node 901D. The timestamp for commit node 901D is added to the audit trail 902 in the second row ("Aug. 22, 2020"). Commit node 901D has one field pointer to field node 901B, so this edge is traversed to reach field node 901C. Field node 901C provides the field name ("Widgets") and the current value of the field ("34") at the time of the commit corresponding to commit node 901D to the second row of audit trail 902. The prior version pointer from field node 901C is then traversed to reach field node 901E. Field node 901E then provides the prior value of the field ("31") in the second row of audit trail 902.

Of course, if a commit node were to change the values of two or more fields, then additional field nodes would be traversed from that commit node, resulting in multiple field name entries in the audit trail (or multiple audit trails corresponding to different fields). The example of FIG. 9 presents only changes to a single field for purposes of clarity and explanation.

Figure 10:
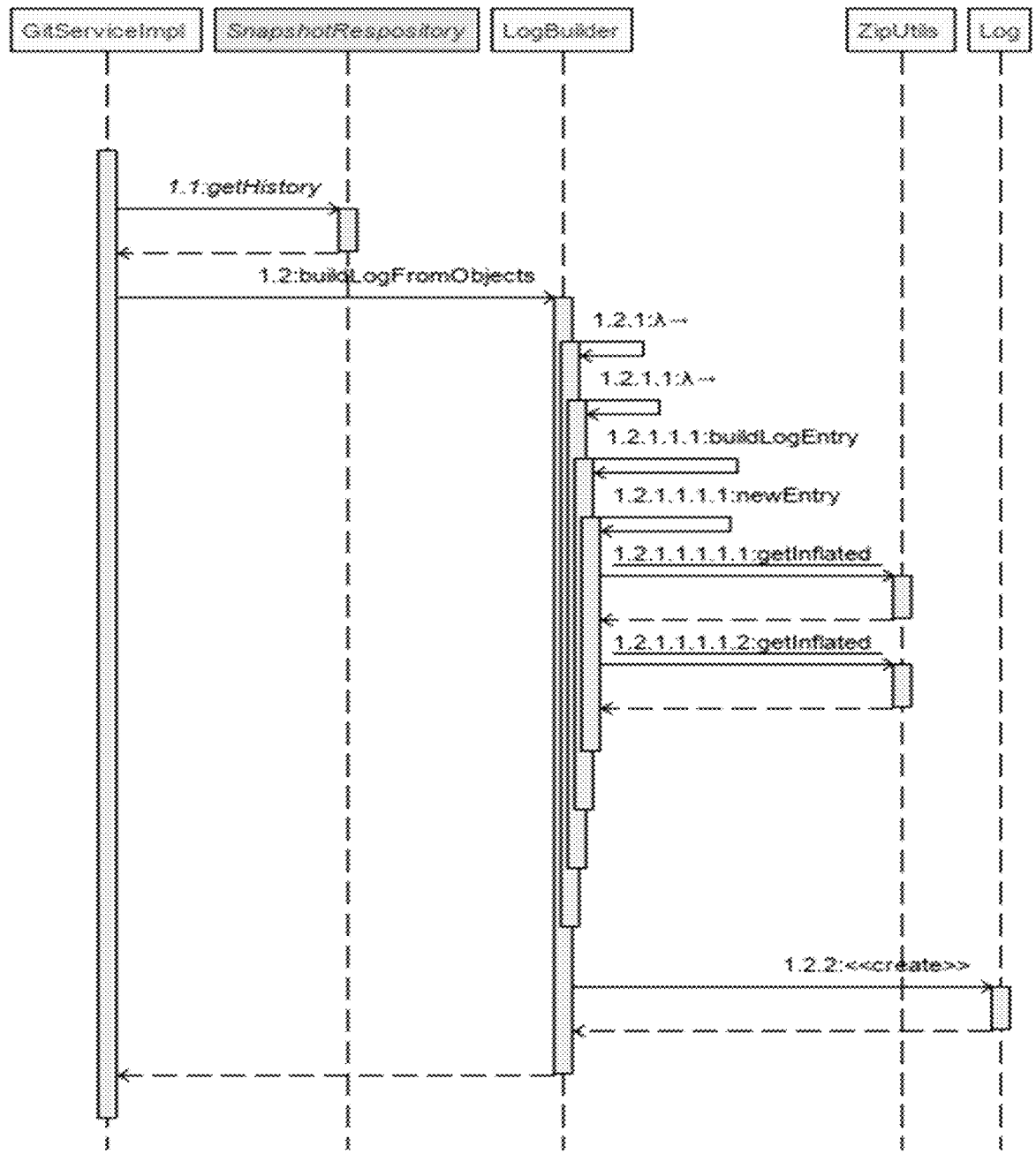
FIG. 10 illustrates an example implementation of the process for generating an audit trail (log) in a Java environment according to an exemplary embodiment.

FIG. 10 illustrates an example implementation of the process for generating an audit trail (log) in a Java environment according to an exemplary embodiment. As shown in FIG. 10, the implementation utilizes a log builder and inflates (decompresses) the values of stored in each field data structure.

Figure 11:
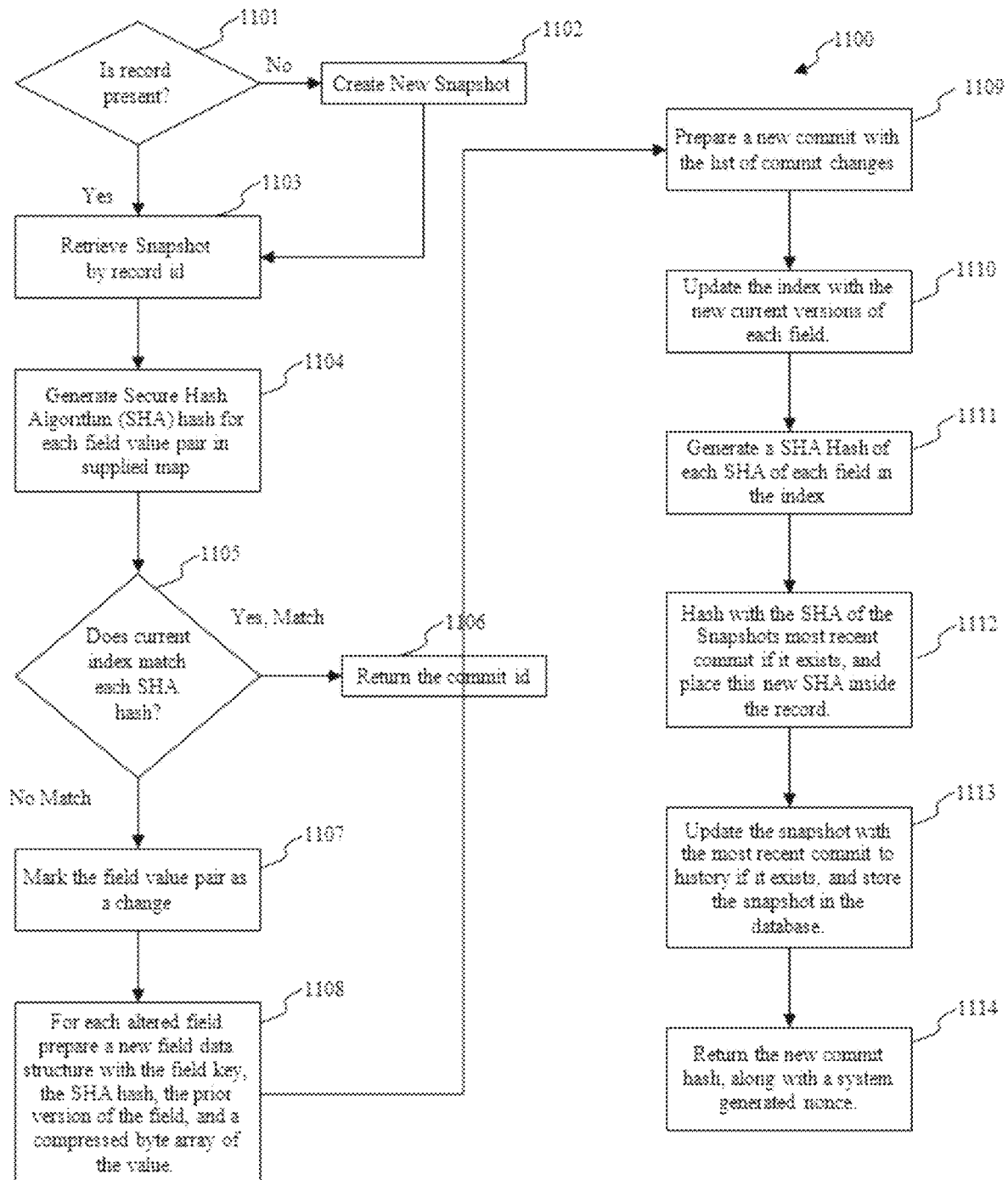
FIG. 11 illustrates a flowchart for committing a new set of changes according to an exemplary embodiment.

FIG. 11 illustrates a flowchart for committing a new set of changes according to an exemplary embodiment. The commit function can take as input a map comprising key value pairs where the key is the name of the field and the value is the value corresponding to the field. The commit function can also take as input a string corresponding to the person committing the changes, a string corresponding to the reason for the changes, and a string corresponding to the recordId of the record to be updated and can return a string corresponding to the commit identifier:
String Commit(Map<String,Serializable> record, String who, String reason, String recordId).

As shown in FIG. 11, at step 1101 it is determined whether or not an electronic data record is present. If the electronic data record is not represent, then a new snapshot is created at step 1102. However, if the record is present the snapshot is retrieved by record id at step 1103. Next, at step 1104, for each field value pair in a supplied map, a Secure Hash Algorithm, for example, SHA-1 hash, is generated. Thereafter, a comparison is done. In particular, at step 1105, a determination is made regarding whether a current index matches each SHA hash. If there is an exact match, and there are no changes to be made, then at step 1106, the commit id is returned. However, if no match is found with the SHA hash, then, at step 1107, the field-value pair is marked as being changed. At step 1108, for each altered field, a new field data structure 1104 is prepared/generated with a field key, the SHA hash, the prior version of the field, and a compressed byte array of the value.

Figure 12A:
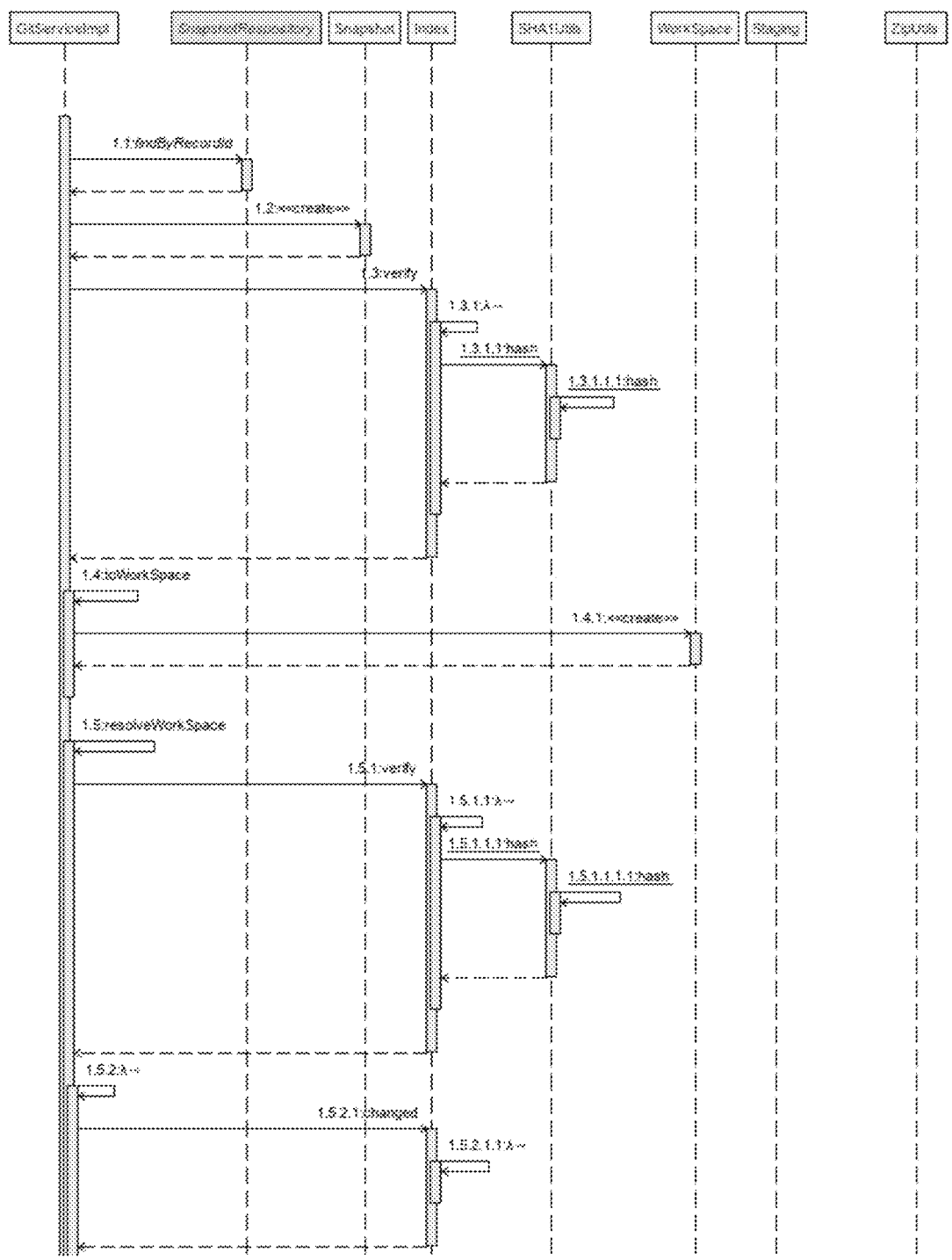
FIGS. 12A-12B illustrates an example implementation of the process for committing a new set of changes in a Java environment according to an exemplary embodiment.
Figure 12B:
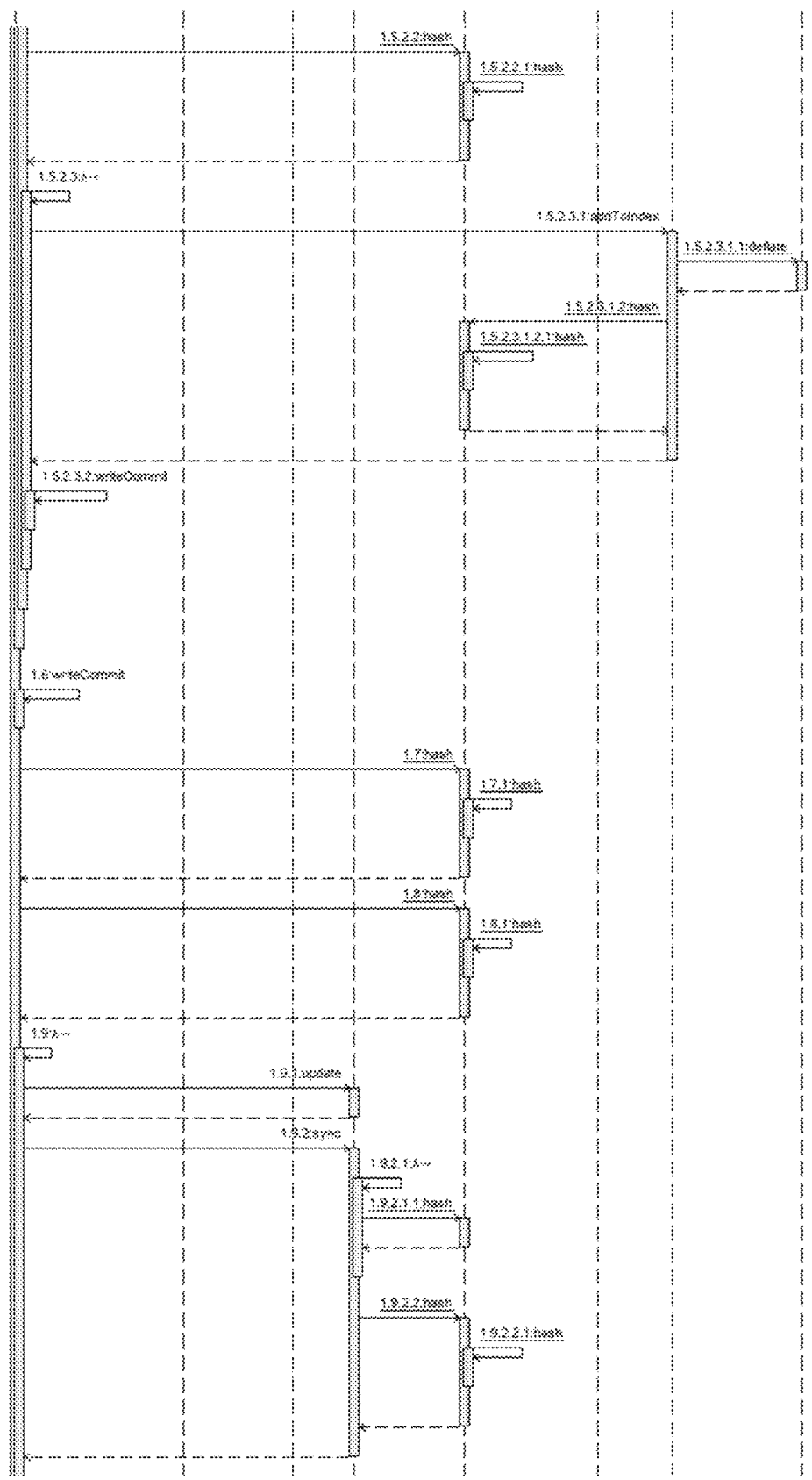

At step 1109, a new commit 103 is prepared/generated with the list of commit changes. At step 1110, the index is updated with the new current versions of each field. At step 1111 a SHA hash of each SHA of each field in the index is generated. At step 1112 the most recent commit is hashed with the SHA of the snapshots if it exists, and this new SHA is placed inside the record at step. At step 1113 the snapshot is updated with the most recent commit, the prior commit is added to history if it exists, and the snapshot is stored in the database. At step 1114 the new commit hash is returned along with a system generated nonce. FIGS. 12A-12B illustrates an example implementation of the process for committing a new set of changes in a Java environment according to an exemplary embodiment.

Figure 13:
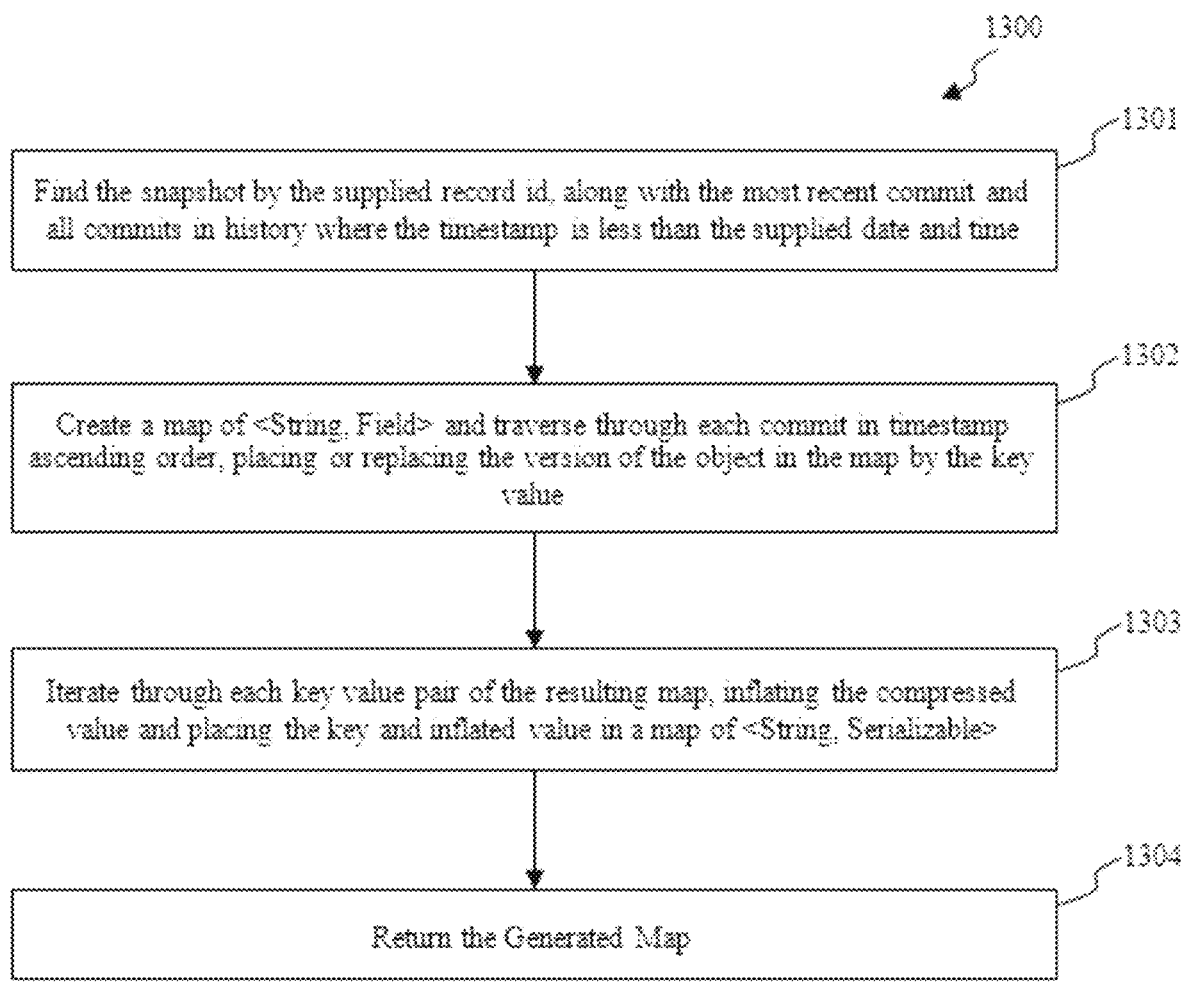
FIG. 13 illustrates a flowchart for requesting a snapshot of a record according to an exemplary embodiment.

FIG. 13 illustrates a flowchart for requesting a snapshot of a record according to an exemplary embodiment. The function for requesting a snapshot takes as input a string corresponding to a record identifier and a date corresponding to the date on which a snapshot of the electronic data record is desired and returns a snapshot data structure:
Snapshot(string recordId, date from)

At step 1301, the snapshot 101 is found using the supplied record id, along with the most recent commit and all commits in history where the timestamp is less than the supplied date time. At step 1302, a map is generated having field names as keys and field data structures as values, in the form <String, Field Data Structure>, and each commit is traversed through in timestamp ascending order, placing or replacing the version of the object in the map by the key value. The aim of this step is to place the latest version of each field in the in the map.

Figure 14:
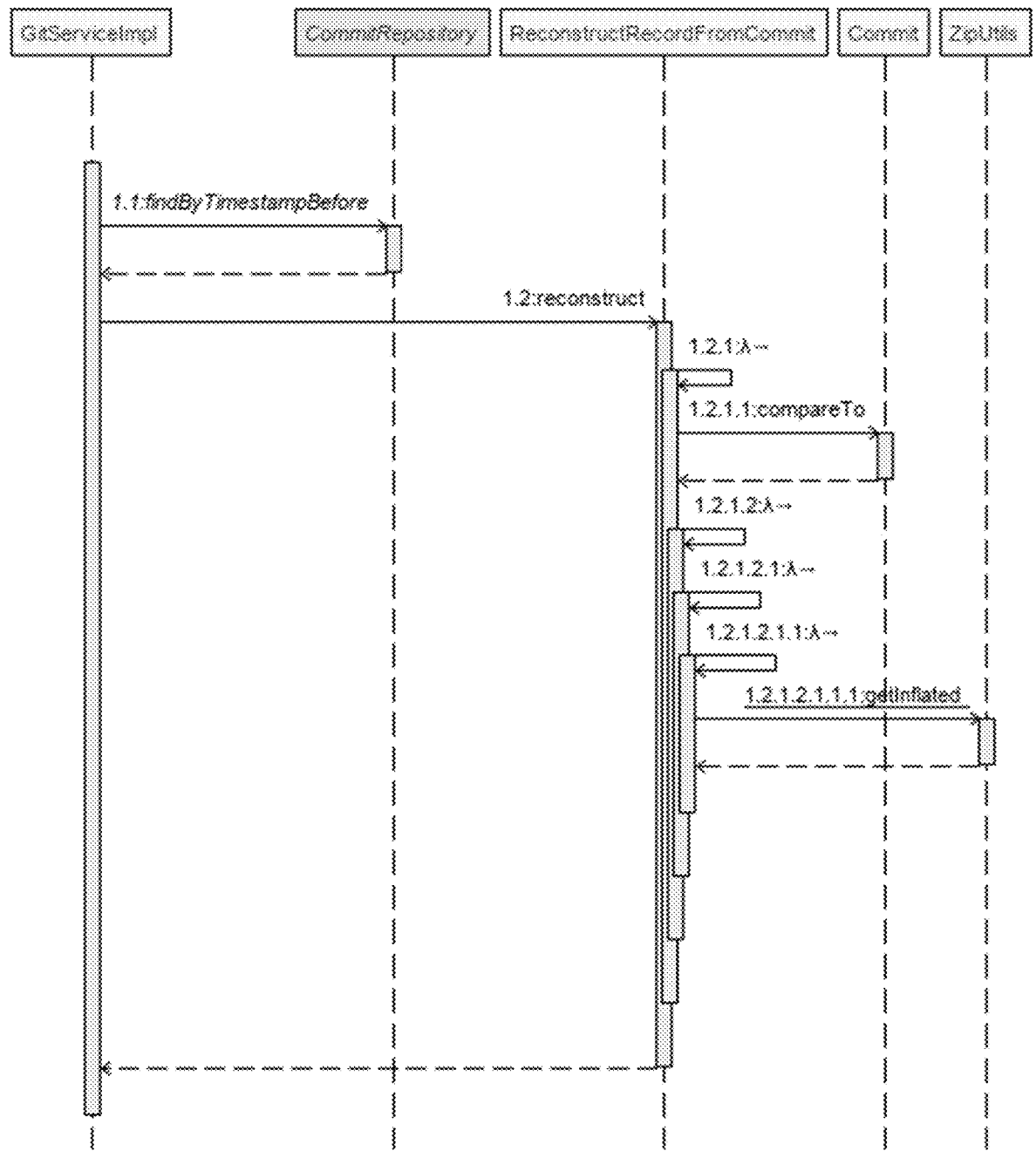
FIG. 14 illustrates an example implementation of the process for generating a snapshot in a Java environment according to an exemplary embodiment.

At step 1303, each key value pair of the resulting map is iterated through, inflating the compressed value and placing the key and inflated value in a map of string and serializable, in the form <String,Serializable>. Serializable refers to an object that can be written to a binary stream and reconstituted. At step 1304 the generated map is returned or outputted on a user interface that represents and reflects the updated information represented at steps 1302 and 1303. FIG. 14 illustrates an example implementation of the process for generating a snapshot in a Java environment according to an exemplary embodiment.

As explained previously, the present system utilizes SHA hashes of the commit data structure to ensure the integrity of the electronic data records and any changes made to fields of the electronic data record. A validation check can be triggered on call and can be ordered to fire at any time. The validation walks through the commit data structures and related field data structures, and calculates a live hash of the commit to compare it to the current hash. Assuming this check passes, it then verifies the previous hash stored matches the hash of the previous commit relationship, and if this check passes walks down the chain until it gets to the first commit.

For example, assuming the simplest scenario, in order to modify the field contents (alter the history of a record) of a third version of a field of a record, an actor would require direct access to the database. Assuming the user did not wish to make a meaningful change to the record (perhaps digital vandalism), they could alter the binary content of the field data structure in the database. The next verification would catch this. It would calculate a live hash of fourth commit, using the stored previous hash, and hashes of the field data structure attached to the commit, and the salt. This would pass. It would then compare the stored previous hash for the fourth commit against the stored previous hash in the third commit. The algorithm would then verify the third commit, which would fail as the contents in the field data structure would no longer result in the same commit hash. Then, the field data structures themselves would be hashed and compared against the stored hash to verify which object was different, identifying the changed record.

In order to make an undetected meaningful change, the prospect becomes much more difficult. The user must first have access to the database, and be able to access the stored binary value. The value must be decompressed and serialized, then changed to a meaningful value. In order to have to calculate the new hash of the field data structure, the user must also have access to the salt. Then the user must also recalculate the hash of the commit, and every commit following the commit altered.

Figure 15:
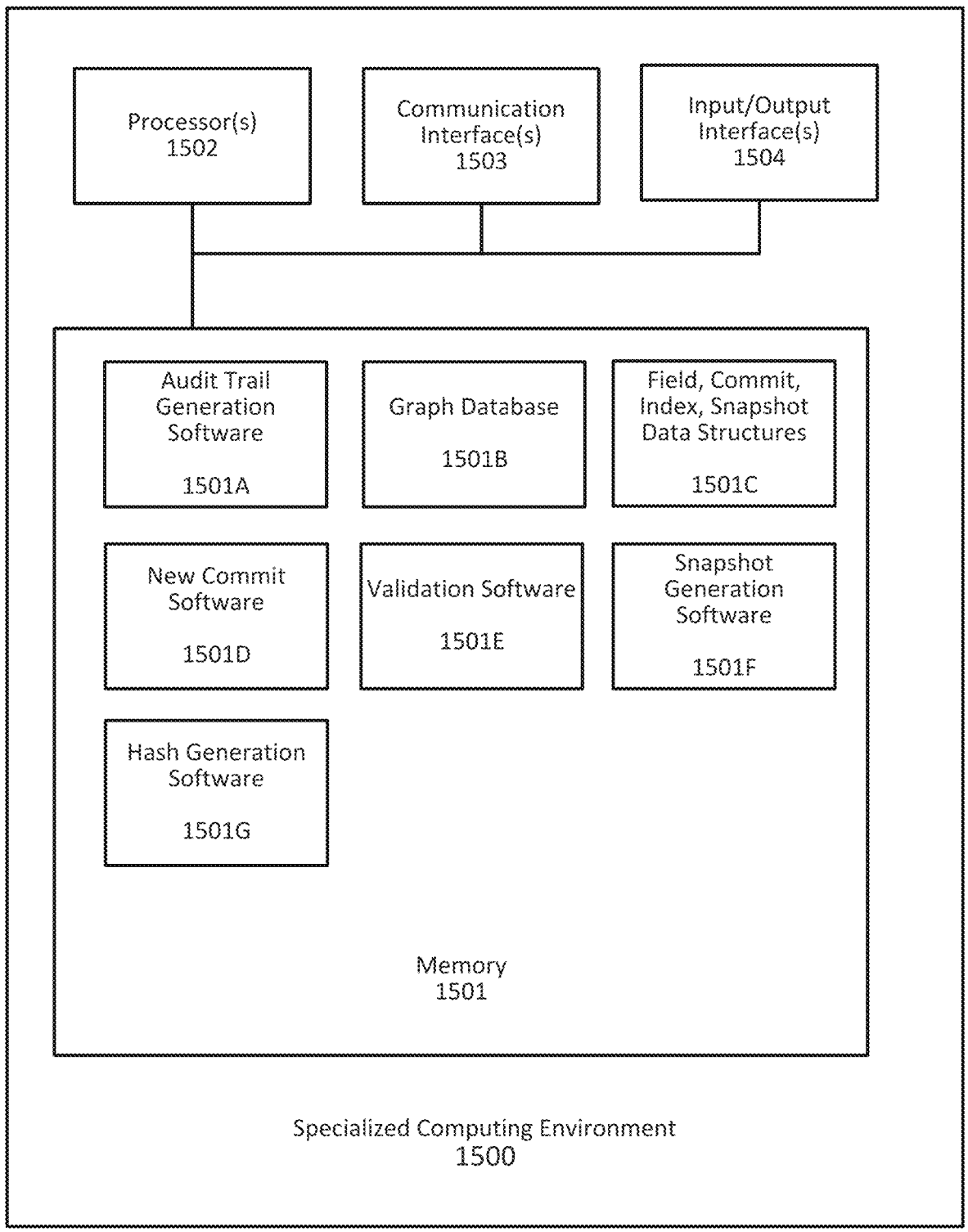
FIG. 15 illustrates a specialized computing environment for generating an audit trail of an electronic data record according to an exemplary embodiment.

FIG. 15 illustrates a specialized computing environment for generating an audit trail of an electronic data record according to an exemplary embodiment. Computing environment 1500 includes a memory 1501 that is a non-transitory computer-readable medium and can be volatile memory (e.g., registers, cache, RAM), non-volatile memory (e.g., ROM, EEPROM, flash memory, etc.), or some combination of the two.

As shown in FIG. 15, memory 1501 stores audit trail generation software 1501A, graph database 1501B, field, commit, index, and snapshot data structures 1501C, new commit software 1501D, validation software 1501E, snapshot generation software 1501F, and hash generation software. Each of the software components in memory 1501 stores specialized instructions and data structures configured to perform the techniques described herein.

As used herein, computer program and/or software can include any sequence machine cognizable steps that perform a function. Such computer program and/or software may be rendered in any programming language or environment including, for example, C/C++, C #, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

All of the software stored within memory 1501 can be stored as a computer-readable instructions, that when executed by one or more processors 1502, cause the processors to perform the functionality described with respect to FIGS. 1-14.

Processor(s) 1502 execute computer-executable instructions and can be a real or virtual processors. In a multi-processing system, multiple processors or multicore processors can be used to execute computer-executable instructions to increase processing power and/or to execute certain software in parallel.

The computing environment additionally includes a communication interface 1503, such as a network interface, which is used to communicate with devices, applications, or processes on a computer network or computing system, collect data from devices on the network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Computing environment 1500 further includes input and output interfaces 1504 that allow users (such as system administrators) to provide input to the system and display or otherwise transmit information for display to users.

An interconnection mechanism (shown as a solid line in FIG. 15), such as a bus, controller, or network interconnects the components of the computing environment 1500.

Input and output interfaces 1504 can be coupled to input and output devices. The input device(s) can be a touch input device such as a keyboard, mouse, pen, trackball, touch screen, or game controller, a voice input device, a scanning device, a digital camera, remote control, or another device that provides input to the computing environment. The output device(s) can be a display, television, monitor, printer, speaker, or another device that provides output from the computing environment 1500. Displays can include a graphical user interface (GUI) that presents options to users such as system administrators for configuring encryption and decryption processes.

The computing environment 1500 can additionally utilize a removable or non-removable storage, such as magnetic disks, magnetic tapes or cassettes, CD-ROMs, CD-RWs, DVDs, USB drives, or any other medium which can be used to store information and which can be accessed within the computing environment 1500.

The computing environment 1500 can be a set-top box, a mobile device, personal computer, a client device, a database or databases, or one or more servers, for example a farm of networked servers, a clustered server environment, or a cloud network of computing devices and/or distributed databases.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

The invention claimed is:

1. A method executed by one or more computing devices for generating an audit trail of an electronic data record, the method comprising:

receiving, by at least one of the one or more computing devices, a request to generate the audit trail of the electronic data record, the request comprising a record identifier of the electronic data record and a date value;

identifying, by at least one of the one or more computing devices, a plurality of commit data structures in a graph database storing a plurality of commit data structures, a plurality of snapshot data structures providing snapshot views of electronic data records, a plurality of index data structures corresponding to current status and values of electronic data records, and a plurality of field data structures storing each field of an electronic data record as a self-contained repository, wherein each data structure is stored as a node in the graph database with pointers between the nodes corresponding to relationships between the nodes, the identified commit data structures corresponding to the electronic data record based at least in part on the record identifier, each commit data structure corresponding to a set of changes previously applied to one or more fields of the electronic data record and comprising a timestamp value, a list of one or more changes made to one or more fields of the electronic data record, and a prior commit pointer pointing to a prior commit data structure corresponding to a previous set of changes applied to one or more fields of the electronic data record;

identifying, by at least one of the one or more computing devices, one or more commit data structures in the plurality of commit data structures in the graph database that are pertinent to the request based at least in part on the timestamp value of at least one commit data structure and the date value based at least in part on a determination that a date of the timestamp value is less than the date value; and generating, by at least one of the one or more computing devices, the audit trail of the electronic data record based at least in part on the list of one or more changes in each commit data structure in the identified one or more commit data structures.

2. The method of claim 1, wherein each commit data structure further comprises:
    a hash value generated based at least in part on the one or more fields of the electronic data record changed by a commit corresponding to the commit data structure; and
    a previous hash value corresponding to a prior hash value of the prior commit data structure pointed to by the prior commit pointer.

3. The method of claim 2, wherein the hash value is further generated based at least in part on a salt value derived from application code of an application associated with the commit.

4. The method of claim 1, wherein identifying a plurality of commit data structures corresponding to the electronic data record based at least in part on the record identifier comprises:
    identifying a snapshot data structure, among the plurality of snapshot data structures in the graph database, corresponding to the electronic data record based at least in part on the record identifier, the snapshot data structure comprising a plurality of commit pointers pointing to the plurality of commit data structures; and
    identifying the plurality of commit data structures by traversing the plurality of commit pointers.

5. The method of claim 1, wherein each commit data structure comprises a prior commit pointer pointing to a prior commit data structure corresponding to a previous set of changes applied to one or more fields of the electronic data record and wherein identifying a plurality of commit data structures corresponding to the electronic data record based at least in part on the record identifier comprises:
    identifying a snapshot data structure, among the plurality of snapshot data structures in the graph database, corresponding to the electronic data record based at least in part on the record identifier, the snapshot data structure comprising a most-recent commit pointer pointing to a most-recent commit data structure;
    identifying the most-recent commit data structure by traversing the most-recent commit pointer; and
    identifying the plurality of commit data structures corresponding to the electronic data record by traversing a plurality of prior commit pointers of the plurality of commit data structures starting with the most-recent commit data structure.

6. The method of claim 1, wherein identifying one or more commit data structures in the plurality of commit data structures that are pertinent to the request based at least in part on the timestamp value of at least one commit data structure and the date value comprises, for at least one commit data structures in the plurality of commit data structures:
    comparing the timestamp of the at least one commit data structure to the date value.

7. The method of claim 1, wherein each commit data structure comprises a prior commit pointer pointing to a prior commit data structure corresponding to a previous set of changes applied to one or more fields of the electronic data record and wherein generating the audit trail of the electronic record based at least in part on the list of one or more changes in each commit data structure in the identified one or more commit data structures comprises:
    identifying a most-recent commit data structure in the identified one or more commit data structures; and
    iterating through each of the one or more commit data structures beginning at the most-recent commit data structure by traversing the prior commit pointer of each commit data structure.

8. The method of claim 1, wherein the list of one or more changes made to one or more fields of the electronic data record comprises a list of one or more field pointers to one or more field data structures among the plurality of field data structures in the graph database, each field data structure corresponding to a field of the electronic data record and comprising:
    a content value indicating contents of the field as a result of a commit corresponding to the commit data structure; and
    a prior-version field pointer to a prior-version field data structure corresponding to the field of the electronic data record prior to the commit.

9. The method of claim 8, wherein generating the audit trail of the electronic data record based at least in part on the list of one or more changes in each commit data structure in the identified one or more commit data structures comprises, for each commit data structure in the identified one or more commit data structures:
    traversing each field pointer in the list of one or more field pointers to identify one or more field data structures, among the plurality of field data structures in the graph database, corresponding to the commit data structure;
    determining the content value of each field data structure in the one or more field data structures;
    traversing the prior-version field pointer of each field data structure in the one or more field data structures to identify one or more prior-version field data structures;
    determining the prior-version content value of each prior-version field data structure in the one or more prior-version field data structures; and
    creating a log record corresponding to the commit data structure, the log record comprising the timestamp value of the commit data structure, the prior-version content value of each prior-version field data structure in the one or more prior-version field data structures, and the content value of each field data structure in the one or more field data structures.

10. The method of claim 6,
    wherein each commit pointer and each field pointer is stored as a directional edge between nodes in the graph database.

11. An apparatus for generating an audit trail of an electronic data record, the apparatus comprising:
    one or more processors; and
    one or more memories operatively coupled to at least one of the one or more processors and having instructions stored thereon that, when executed by at least one of the one or more processors, cause at least one of the one or more processors to:
    receive a request to generate an audit trail of the electronic data record, the request comprising a record identifier of the electronic data record and a date value;
    identify a plurality of commit data structures in a graph database storing a plurality of commit data structures, a plurality of snapshot data structures providing snapshot views of electronic data records, a plurality of index data structures corresponding to current status and values of electronic data records, and a plurality of field data structures storing each field of an electronic data record as a self-contained repository, wherein each data structure is stored as a node in the graph database with pointers between the nodes corresponding to relationships between the nodes, the identified commit data structures corresponding to the electronic data record based at least in part on the record identifier, each commit data structure corresponding to a set of changes previously applied to one or more fields of the electronic data record and comprising a timestamp value, a list of one or more changes made to one or more fields of the electronic data record, and a prior commit pointer pointing to a prior commit data structure corresponding to a previous set of changes applied to one or more fields of the electronic data record;

identify one or more commit data structures in the plurality of commit data structures in the graph database that are pertinent to the request based at least in part on the timestamp value of at least one commit data structure and the date value; and generate the audit trail of the electronic data record based at least in part on the list of one or more changes in each commit data structure in the identified one or more commit data structures.

12. The apparatus of claim 11, wherein each commit data structure further comprises:

a hash value generated based at least in part on the one or more fields of the electronic data record changed by a commit corresponding to the commit data structure; and a previous hash value corresponding to a prior hash value of the prior commit data structure pointed to by the prior commit pointer.

13. The apparatus of claim 12, wherein the hash value is further generated based at least in part on a salt value derived from application code of an application associated with the commit.

14. The apparatus of claim 11, wherein the instructions that, when executed by at least one of the one or more processors, cause at least one of the one or more processors to identify a plurality of commit data structures corresponding to the electronic data record based at least in part on the record identifier further cause at least one of the one or more processors to:

identify a snapshot data structure, among the plurality of snapshot data structures in the graph database, corresponding to the electronic data record based at least in part on the record identifier, the snapshot data structure comprising a plurality of commit pointers pointing to the plurality of commit data structures; and identify the plurality of commit data structures by traversing the plurality of commit pointers.

15. The apparatus of claim 11, wherein each commit data structure comprises a prior commit pointer pointing to a prior commit data structure corresponding to a previous set of changes applied to one or more fields of the electronic data record and wherein the instructions that, when executed by at least one of the one or more processors, cause at least one of the one or more processors to identify a plurality of commit data structures corresponding to the electronic data record based at least in part on the record identifier further cause at least one of the one or more processors to:

identify a snapshot data structure, among the plurality of snapshot data structures in the graph database, corresponding to the electronic data record based at least in part on the record identifier, the snapshot data structure comprising a most-recent commit pointer pointing to a most-recent commit data structure;

identify the most-recent commit data structure by traversing the most-recent commit pointer; and identify the plurality of commit data structures corresponding to the electronic data record by traversing a plurality of prior commit pointers of the plurality of commit data structures starting with the most-recent commit data structure.

16. The apparatus of claim 11, wherein the instructions that, when executed by at least one of the one or more processors, cause at least one of the one or more processors to identify one or more commit data structures in the plurality of commit data structures that are pertinent to the request based at least in part on the timestamp value of at least one commit data structure and the date value comprises, for at least one commit data structures in the plurality of commit data structures:

compare the timestamp of the at least one commit data structure to the date value; and identify the at least one commit data structure as pertinent to the request based at least in part on a determination that a date of the timestamp is less than the date value.

17. The apparatus of claim 11, wherein each commit data structure comprises a prior commit pointer pointing to a prior commit data structure corresponding to a previous set of changes applied to one or more fields of the electronic data record, and wherein the instructions that, when executed by at least one of the one or more processors, cause at least one of the one or more processors to generate the audit trail of the electronic record based at least in part on the list of one or more changes in each commit data structure in the identified one or more commit data structures further cause at least one of the one or more processors to:

identify a most-recent commit data structure in the identified one or more commit data structures; and iterate through each of the one or more commit data structures beginning at the most-recent commit data structure by traversing the prior commit pointer of each commit data structure.

18. The apparatus of claim 11, wherein the list of one or more changes made to one or more fields of the electronic data record comprises a list of one or more field pointers to one or more field data structures among the plurality of field data structures in the graph database, each field data structure corresponding to a field of the electronic data record and comprising:

a content value indicating contents of the field as a result of a commit corresponding to the commit data structure; and a prior-version field pointer to a prior-version field data structure corresponding to the field of the electronic data record prior to the commit.

19. The apparatus of claim 18, wherein the instructions that, when executed by at least one of the one or more processors, cause at least one of the one or more processors to generate the audit trail of the electronic data record based at least in part on the list of one or more changes in each commit data structure in the identified one or more commit data structures further cause at least one of the one or more processors to, for each commit data structure in the identified one or more commit data structures:

traverse each field pointer in the list of one or more field pointers to identify one or more field data structures, among the plurality of field data structures in the graph database, corresponding to the commit data structure;
determine the content value of each field data structure in the one or more field data structures;
traverse the prior-version field pointer of each field data structure in the one or more field data structures to identify one or more prior-version field data structures;
determine the prior-version content value of each prior-version field data structure in the one or more prior-version field data structures; and
create a log record corresponding to the commit data structure, the log record comprising the timestamp value of the commit data structure, the prior-version content value of each prior-version field data structure in the one or more prior-version field data structures, and the content value of each field data structure in the one or more field data structures.

20. The apparatus of claim 16,
wherein each commit pointer and each field pointer is stored as a directional edge between nodes in the graph database.

21. At least one non-transitory computer-readable medium storing computer-readable instructions that, when executed by one or more computing devices, cause at least one of the one or more computing devices to:
receive a request to generate an audit trail of an electronic data record, the request comprising a record identifier of the electronic data record and a date value;
identify a plurality of commit data structures in a graph database storing a plurality of commit data structures, a plurality of snapshot data structures providing snapshot views of electronic data records, a plurality of index data structures corresponding to current status and values of electronic data records, and a plurality of field data structures storing each field of an electronic data record as a self-contained repository, wherein each data structure is stored as a node in the graph database with pointers between the nodes corresponding to relationships between the nodes, the identified commit data structures corresponding to the electronic data record based at least in part on the record identifier, each commit data structure corresponding to a set of changes previously applied to one or more fields of the electronic data record and comprising a timestamp value, a list of one or more changes made to one or more fields of the electronic data record, and a prior commit pointer pointing to a prior commit data structure corresponding to a previous set of changes applied to one or more fields of the electronic data record;
identify one or more commit data structures in the plurality of commit data structures in the graph database that are pertinent to the request based at least in part on the timestamp value of at least one commit data structure and the date value; and
generate the audit trail of the electronic data record based at least in part on the list of one or more changes in each commit data structure in the identified one or more commit data structures.

22. The at least one non-transitory computer-readable medium of claim 21, wherein each commit data structure further comprises:
a hash value generated based at least in part on the one or more fields of the electronic data record changed by a commit corresponding to the commit data structure; and a previous hash value corresponding to a prior hash value of the prior commit data structure pointed to by the prior commit pointer.

23. The at least one non-transitory computer-readable medium of claim 22, wherein the hash value is further generated based at least in part on a salt value derived from application code of an application associated with the commit.

24. The at least one non-transitory computer-readable medium of claim 21, wherein the instructions that, when executed by at least one of the one or more computing devices, cause at least one of the one or more computing devices to identify a plurality of commit data structures corresponding to the electronic data record based at least in part on the record identifier further cause at least one of the one or more computing devices to:
identify a snapshot data structure, among the plurality of snapshot data structures in the graph database, corresponding to the electronic data record based at least in part on the record identifier, the snapshot data structure comprising a plurality of commit pointers pointing to the plurality of commit data structures; and
identify the plurality of commit data structures by traversing the plurality of commit pointers.

25. The at least one non-transitory computer-readable medium of claim 21, wherein each commit data structure comprises a prior commit pointer pointing to a prior commit data structure corresponding to a previous set of changes applied to one or more fields of the electronic data record and wherein the instructions that, when executed by at least one of the one or more computing devices, cause at least one of the one or more computing devices to identify a plurality of commit data structures corresponding to the electronic data record based at least in part on the record identifier further cause at least one of the one or more computing devices to:
identify a snapshot data structure, among the plurality of snapshot data structures in the graph database, corresponding to the electronic data record based at least in part on the record identifier, the snapshot data structure comprising a most-recent commit pointer pointing to a most-recent commit data structure;
identify the most-recent commit data structure by traversing the most-recent commit pointer; and
identify the plurality of commit data structures corresponding to the electronic data record by traversing a plurality of prior commit pointers of the plurality of commit data structures starting with the most-recent commit data structure.

26. The at least one non-transitory computer-readable medium of claim 21, wherein the instructions that, when executed by at least one of the one or more computing devices, cause at least one of the one or more computing devices to identify one or more commit data structures in the plurality of commit data structures that are pertinent to the request based at least in part on the timestamp value of at least one commit data structure and the date value comprises, for at least one commit data structures in the plurality of commit data structures:
compare the timestamp of the at least one commit data structure to the date value; and
identify the at least one commit data structure as pertinent to the request based at least in part on a determination that a date of the timestamp is less than the date value.

27. The at least one non-transitory computer-readable medium of claim 21, wherein each commit data structure comprises a prior commit pointer pointing to a prior commit data structure corresponding to a previous set of changes applied to one or more fields of the electronic data record and wherein the instructions that, when executed by at least one of the one or more computing devices, cause at least one of the one or more computing devices to generate the audit trail of the electronic record based at least in part on the list of one or more changes in each commit data structure in the identified one or more commit data structures further cause at least one of the one or more computing devices to:
- identify a most-recent commit data structure in the identified one or more commit data structures; and
- iterate through each of the one or more commit data structures beginning at the most-recent commit data structure by traversing the prior commit pointer of each commit data structure.

28. The at least one non-transitory computer-readable medium of claim 21, wherein the list of one or more changes made to one or more fields of the electronic data record comprises a list of one or more field pointers to one or more field data structures among the plurality of field data structures in the graph database, each field data structure corresponding to a field of the electronic data record and comprising:
- a content value indicating contents of the field as a result of a commit corresponding to the commit data structure; and
- a prior-version field pointer to a prior-version field data structure corresponding to the field of the electronic data record prior to the commit.

29. The at least one non-transitory computer-readable medium of claim 28, wherein the instructions that, when executed by at least one of the one or more computing devices, cause at least one of the one or more computing devices to generate the audit trail of the electronic data record based at least in part on the list of one or more changes in each commit data structure in the identified one or more commit data structures further cause at least one of the one or more computing devices to, for each commit data structure in the identified one or more commit data structures:
- traverse each field pointer in the list of one or more field pointers to identify one or more field data structures, among the plurality of field data structures in the graph database, corresponding to the commit data structure;
- determine the content value of each field data structure in the one or more field data structures;
- traverse the prior-version field pointer of each field data structure in the one or more field data structures to identify one or more prior-version field data structures;
- determine the prior-version content value of each prior-version field data structure in the one or more prior-version field data structures; and
- create a log record corresponding to the commit data structure, the log record comprising the timestamp value of the commit data structure, the prior-version content value of each prior-version field data structure in the one or more prior-version field data structures, and the content value of each field data structure in the one or more field data structures.

30. The at least one non-transitory computer-readable medium of claim 26, wherein each commit pointer and each field pointer is stored as a directional edge between nodes in the graph database.

* * * * *